(12) United States Patent
Burke et al.

(10) Patent No.: US 9,396,819 B2
(45) Date of Patent: Jul. 19, 2016

(54) SINGLE PASS RF DRIVER

(71) Applicant: Arcata Systems, Santa Cruz, CA (US)

(72) Inventors: Robert J. Burke, Santa Cruz, CA (US); Alexander Thomas Burke, Palo Alto, CA (US)

(73) Assignee: Arcata Systems, Santa Cruz, CA (US)

( * ) Notice: Subject to any disclaimer, the term of this patent is extended or adjusted under 35 U.S.C. 154(b) by 347 days.

(21) Appl. No.: 14/046,822

(22) Filed: Oct. 4, 2013

(65) Prior Publication Data
US 2014/0098916 A1    Apr. 10, 2014

Related U.S. Application Data

(60) Provisional application No. 61/710,521, filed on Oct. 5, 2012.

(51) Int. Cl.
*G21B 1/15*   (2006.01)
*G21B 3/00*   (2006.01)

(52) U.S. Cl.
CPC *G21B 3/006* (2013.01); *G21B 1/15* (2013.01); *Y02E 30/16* (2013.01)

(58) Field of Classification Search
USPC ........................................ 376/105, 106, 120
See application file for complete search history.

(56) References Cited

U.S. PATENT DOCUMENTS

| | | | |
|---|---|---|---|
| 4,128,764 A | * | 12/1978 | Luce ............................. 250/398 |
| 4,381,280 A | * | 4/1983 | Roberts ......................... 376/105 |
| 4,401,618 A | * | 8/1983 | Salisbury ....................... 376/106 |
| 4,525,323 A | * | 6/1985 | Bangerter et al. ............. 376/106 |

OTHER PUBLICATIONS

"Concurrent Engineering: Strategies", retrieved online from url: http://best.berkeley.edu/~pps/pps/concurrent.html, Mar. 1998, 5 pages.
"DOE Classification Guide", Section H. Special Applications, Inertial Confinement (ICF), 1 page.
"International Energy Outlook 2004", Energy Information Administration; retrieved online from url: www.eia.doe.gov/oiaf/ieo/index.html, Apr. 2004, 256 pages.
"Intertial Confinement Fusion (ICF)", Department of Energy Classification Guide for ICF, Jun. 1994, 1 page.
"National Nuclear Security Administration's Path Forward to Achieving Ignition in the Inertial Confinement Fusion Program", U.S. Department of Energy; Report to Congress, Dec. 2012, 37 pages.
"Technical Volume to the Full Application for the Project Named: High Fidelity Simulations of Heavy-Ion-Driven Implosion and Fast Ignition (HFSI) by the Single-Pass RF Driver (SPRFD): Risk Reduction for Power Production by Inertial Confinement Fusion (ICF)", HFSI Project, Jul. 2012, 51 pages.

(Continued)

*Primary Examiner* — Sean P Burke
(74) *Attorney, Agent, or Firm* — Michael A. Glenn; Perkins Coie LLP

(57) ABSTRACT

The disclosed embodiments relate to ion delivery mechanisms, e.g., for fusion power. Particularly, some embodiments relate to systems and methods for delivering ions to a fuel source in such a manner to initiate fast ignition. The ions may be accumulated into "microbunches" and delivered to the fuel with considerable energy and velocity. The impact may compress the fuel while delivering sufficient energy to begin the fusion reaction.

13 Claims, 19 Drawing Sheets

(56) References Cited

OTHER PUBLICATIONS

Atzeni, S. et al., "The Physics of Inertial Fusion: BeamPlasma Interaction, Hydrodynamics, Hot Dense Matter", Oxford Scholarship Online; 2004; ISBN-13: 9780198562641, 2004, p. 68.

Basko, et al., "Prospects of heavy ion fusion in cylindrical geometry", Laser and Particle Beams (2002), 20, Jul. 2002, pp. 411-414.

Burke, R., "The Single Pass RF Driver: Final beam compression", Nuclear Instruments and Methods in Physics Research Section A: Accelerators, Spectrometers, Detectors and Associated Equipment; available online at url: www.sciencedirect.com/science/article/pii/S0168900213006918, Jul. 31, 2013, 10 pages.

Burke, R. J., "Argonne National Laboratory (ANL) Design Activities", Proceedings of the Heavy Ion Fusion Workshop Held at Argonne National Laboratory; Argonne, Illinois, Sep. 1978, pp. 5-11.

Burke, R. J. et al., "Direct Conversion of Neutron Energy and Other Advantages of a Large Yield Per Pulse, Inertial-Confinement Fusion Reactor", ENG/CTR Technical Memorandum No. 19; presented at First Topical Meeting on the Technology of Controlled Nuclear Fusion, San Diego, CA, Apr. 1974, 15 pages.

Grayson, "Classification Review Support: The Technical Guidance Division", Office of Nuclear and National Security Information Weekly Report, Feb. 2001, 4 pages.

Helsley, et al., "Profitable HIF Power Production", High Energy Density Physics with Intense Ion and Laser Beams 2010, Annual Report Contributions of the High Energy Density Physics Community; GSI-2011-2, Report, Dec. 2011, p. 60.

Henestroza, et al., "Progress towards a high-gain and robust target design for heavy ion fusion", Physics of Plasmas, 19, 072706, Jul. 2012, 8 pages.

Hofman, et al., "The HIDIF-Study: Report of the European Study Group on heavy Ion Driven Inertial Fusion for the Period 1995-1998", European Study Group on Heavy-Ion Driven Inertial Fusion; GSI-Report-98-06, Aug. 1998, 227 pages.

Kaganovich, et al., "Physics of neutralization of intense high-energy ion beam pulses by electrons", Physics of Plasmas 17, 056703, Mar. 2010, 20 pages.

Koeth, et al., "Bunch-End Interpenetration During Evolution to Longitudinal Uniformity in a Space-Charge-Dominated Storage Ring", Proceedings of 2011 Particle Accelerator Conference, New York, USA, Mar. 28-Apr. 1, 2011, 5 pages.

Koshkarev, D. G., "Charge-symmetric driver for heavy-ion fusion", II Nuovo Cimento A, vol. 106, Issue 11, Nov. 1993, pp. 1567-1573.

Lindl, et al., "The physics basis for ignition using indirect-drive targets on the National Ignition Facility", Physics of Plasma, vol. 11, No. 2, Feb. 2004, 154 pages.

Meier, et al., "IFE Chamber Technology—Status and Future Challenges", Fusion Science and Technology, vol. 44, Jul. 2003, pp. 27-33.

Moir, et al., "Liquid wall chambers for HIF", Presentation to the 19th International Symposium on Heavy Ion Inertial Fusion (HIF2012), Berkeley, California, Aug. 2012, 17 pages.

Sharkov, B., "Overview of Russian heavy-ion inertial fusion energy program", ScienceDirect; Nuclear Instruments and Methods in Physics Research A 577, Feb. 2007, pp. 14-20.

Startsev, et al., "Effects of beam-plasma instabilities on neutralized propagation of intense ion beams in background plasma", Preprint submitted to Nuclear Inst. and Methods in Physics Research, A, Oct. 9, 2012, 4 pages.

Teng, et al., Proceedings of the Heavy Ion Fusion Workshop Held at Argonne National Laboratory; Editor, R.C. Arnold, Sep. 1978, p. 166.

Varentsov, D., "Energy Loss Dynamics of Intense Heavy Ion Beams Interacting with Dense Matter", Dissertation, Technishcen Universitaet Darmstadt, Oct. 2002, 117 pages.

Watson, et al., "A High Intensity 1.5 Megavolt Heavy Ion Preaccelerator for Ion Beam Fusion", IEEE Transactions on Nuclear Science, vol. NS-26, No. 3, Jun. 1979, 3 pages.

Yu, et al., "An updated point design for heavy in fusion", Lawrence Berkeley National Laboratory; retrieved online from url: www.escholarship.org/uc/item/6vq5x9x8, Nov. 2002, 9 pages.

\* cited by examiner

1400

| Group | Driver use | Range % of (max) (%) | Isos (mm) | Mass (amu) | Z | Name | Energy (GeV) | Distance to pellet (m) | μBunch at pellet (ns) | Slug at pellet (ns) | Stick BF (MV) | Slug energy (MJ) | Isotope eight beams (MJ) | Energy (MJ) | Power (TW) | Shape (pk/avg) | Peak (TW) |
|---|---|---|---|---|---|---|---|---|---|---|---|---|---|---|---|---|---|
| A | Barrel | 100 | 3 | 130 | 54 | Xe | 20.30 | 3000 | 9.4 | 150 | 461 | 0.25 | 1.97 | 3.9 | 26.2 | 4 | 105 |
|   |   |   |   | 131 | 54 | Xe | 19.94 |   | 9.4 | 150 | 457 | 0.25 | 1.98 |   |   |   |   |
| B1 | Bragg peak for waists | 70 | 4 | 144 |   | Nd | 18.38 | 3000 | 10.1 | 75 | 228 | 0.23 | 1.81 | 6.9 | 92.2 | 4 | 369 |
|   |   |   |   | 145 |   | Nd | 18.25 |   | 10.2 | 75 | 226 | 0.22 | 1.79 |   |   |   |   |
|   |   |   |   | 149 |   | Nd | 17.93 |   | 10.2 | 75 | 220 | 0.22 | 1.76 |   |   |   |   |
|   |   |   |   | 150 |   | Nd | 15.82 |   | 10.3 | 75 | 196 | 0.19 | 1.56 |   |   |   |   |
| B2 | Bragg peak bear waists | 30 | 4 | 192 |   | Pt | 14.15 | 3000 | 12.8 | 75 | 139 | 0.17 | 1.38 | 5.5 | 73.1 | 4 | 293 |
|   |   |   |   | 194 |   | Pt | 14.01 |   | 13.0 | 75 | 136 | 0.17 | 1.38 |   |   |   |   |
|   |   |   |   | 196 |   | Pt | 13.98 |   | 13.1 | 75 | 124 | 0.17 | 1.36 |   |   |   |   |
|   |   |   |   | 198 |   | Pt | 13.75 |   | 13.2 | 75 | 131 | 0.17 | 1.33 |   |   |   |   |
| EF | End caps Fast ignition | 15 | 6 | 236 | 93 | Np | 13.66 | 2000 | 10.3 | 75 | 143 | 0.14 | 1.15 | 6.7 | 88.7 | 4 | 355 |
|   |   |   |   | 237 | 93 | Np | 11.61 |   | 10.6 | 75 | 142 | 0.14 | 1.14 |   |   |   |   |
|   |   |   |   | 244 | 96 | Cm | 11.29 |   | 10.6 | 75 | 134 | 0.14 | 1.11 |   |   |   |   |
|   |   |   |   | 245 | 96 | Cm | 11.25 |   | 10.6 | 75 | 133 | 0.14 | 1.11 |   |   |   |   |
|   |   |   |   | 252 | 99 | Cf | 10.95 |   | 10.9 | 75 | 127 | 0.13 | 1.08 |   |   |   |   |
|   |   |   |   | 253 | 99 | Cf | 10.91 |   | 10.9 | 75 | 126 | 0.13 | 1.07 |   |   |   |   |
|   |   |   |   |   |   |   |   |   |   |   |   |   | Totals | 23 |   |   | 1121 |
|   |   |   |   |   |   |   |   |   |   |   |   | Total peak heating (TW) of each rod by short range isotopes |   |   |   |   | 813 |

FIG. 14

SINGLE PASS RF DRIVER

CROSS-REFERENCE TO RELATED APPLICATIONS

This application claims the priority benefit of and is a nonprovisional application of U.S. Provisional Patent Application No. 61/710,521, filed Oct. 5, 2012 and titled "Single Pass RF Driver and Fusion Power System" the contents of which are incorporated herein by reference in their entirety for all purposes.

FIELD

Various of the disclosed embodiments relate systems and methods ion grouping and composition such as may be used, e.g., for achieving ignition in nuclear fusion.

BACKGROUND

Nuclear fusion power has the potential to produce safe and clean energy in great abundance. Nuclear fusion does not produce as many radioactive particles as nuclear fission, produces more power than fission, averts many international complications by not producing weapons-grade byproducts prevalent in uranium-based fission systems, and is easier and less dangerous to control during failure as compared to a runaway fission reaction. Unfortunately, the technology developments required to initiate an economically significant fusion reaction are greater than for fission systems and so the latter has achieved more rapid development.

Several approaches presently seek to achieve sustainable fusion (producing more energy than was input to the system) with varying degrees of developmental success. For example, the National Ignition Facility at Lawrence Livermore National Laboratory has sought to employ a driver laser to compress fusion fuel. Laser energy presents many challenges, however, and progress has not been as rapid as expected. In contrast, more "conservative" inertial approaches, such as the Heavy Ion Fusion methods of the 1970s, remain, in many respects, more practical and effective. In some instances, inertial methods employ proven technologies including conventional accelerator designs using technology which have been extant since at least 1976. However, these accelerator systems often emphasize features appropriate for research purposes and their tools must be retooled, or complemented, before they can be employed for power generation. Fuel ignition demands that considerable energy be delivered in a short period of time and the power levels used at most linear accelerators for research are inadequate.

Accordingly, there exists a need for tools which can complement or supplement existing technologies to achieve the theoretical limits required for fusion ignition.

BRIEF DESCRIPTION OF THE DRAWINGS

One or more embodiments of the present disclosure are illustrated by way of example and not limitation in the figures of the accompanying drawings, in which like references indicate similar elements.

FIG. 14 is a table depicting parameters of a driver pulse comprising Groups of Isotopic Slugs which are chosen to locate the Bragg Peaks at the end of the different ranges of the different isotopes in a given Group in relative proximity to each other in the pellet material.

Figure 1:
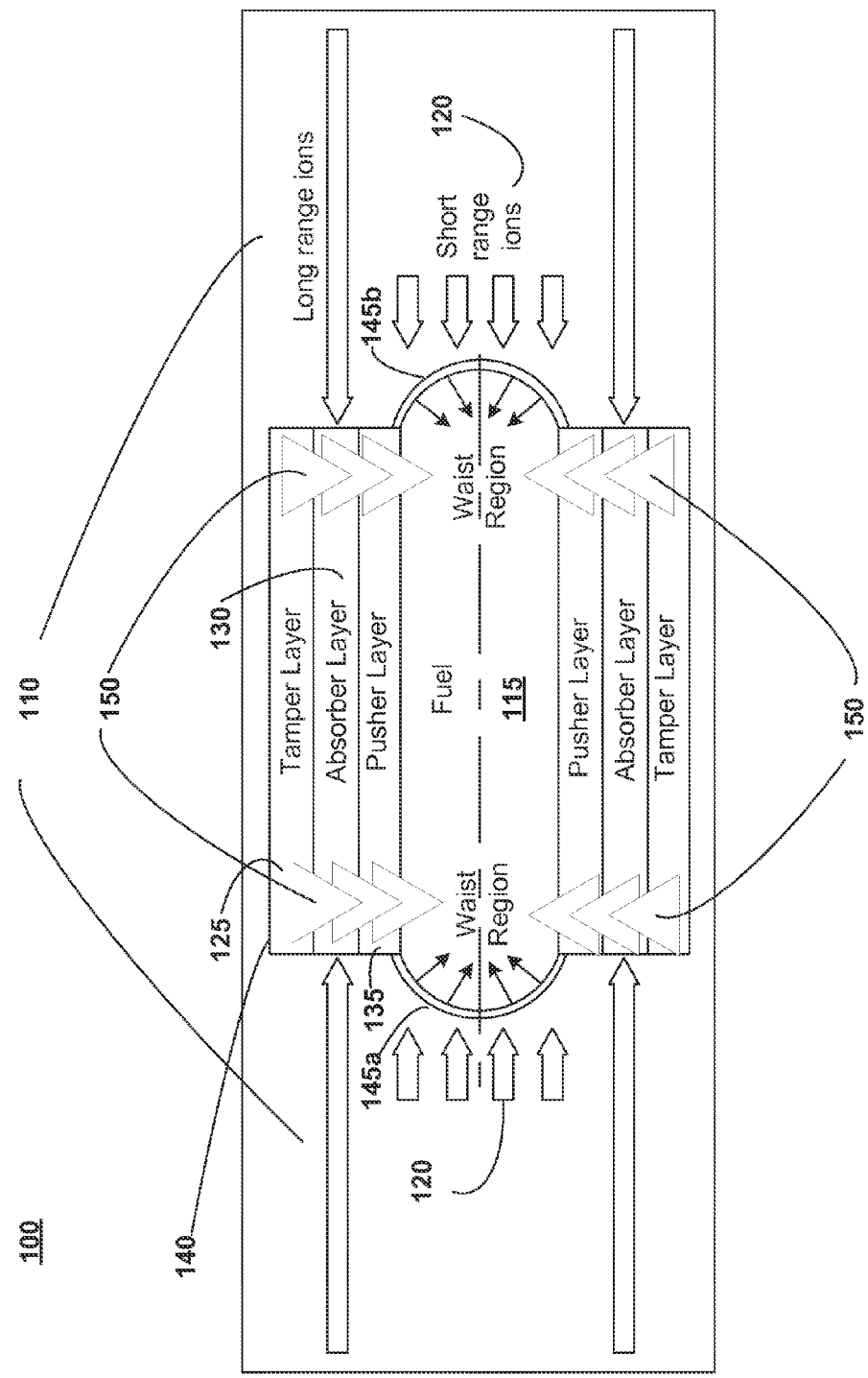
FIG. 1 illustrates a fuel assembly as may be employed in some embodiments.

Those skilled in the art will appreciate that the logic and process steps illustrated in the various flow diagrams discussed below may be altered in a variety of ways. For example, the order of the logic may be rearranged, substeps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; etc. As used herein a "microbunch" refers to a grouping of ions, e.g., a group associated with a same species.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

System Overview

Various embodiments relate to ion delivery mechanisms, e.g., for use in fusion energy systems. Particularly, some embodiments disclose a Single Pass RF Driver (SPRFD) from the vantage point of the final beam compression and the potential advantages for ignition and high gain introduced by components that shape the driver energy deposition in space and time.

In some embodiments, the SPRFD provides methods for compacting the beam from the linear accelerator without storage rings. For example, the SPRFD may structure the ion delivery based upon the varied composition of the isotopes. Magnetic switches on a first set of delay lines may rearrange the internal structure of the various isotopic beams in some embodiments. A second set of delay lines may set the relative timing of the isotopic beam sections so they will telescope at the pellet, in one of multiple fusion chambers.

Some embodiments contemplate a coordinated operation of the processes from the slick to the pellet, as described in greater detail below, so as to maximize the efficiency with which energy is delivered. Some embodiments consider the specific choices of isotope masses and in turn their speeds according to the telescoping condition of equal magnetic rigidity. The length of the slugs of different isotopes at input to their particular slicks is another factor considered for beam line arrangement.

Maintaining the microbunch structure in some of the disclosed embodiments allows radiofrequency (RF) timing to synchronize operations from pellet injection to ion source pulsing. The precision can be illustrated by, e.g., RF phase control of r1E-3 at 800 MHz, i.e., 1.25 ps. The flexibility of this control accommodates different beam line lengths to multiple fusion chambers. This may provide SPRFD adaptability to geography, geology, and the built environment, which may facilitate various economies of scale.

Though various operations are discussed separately below, one will recognize that they may be integrated in some embodiments. For example, the operations of the snugger and slick may be combined. In some embodiments, the slick may be a snugger without a snug stop. Thus, ion bunches in the snugger may come arbitrarily close to one another in some embodiments.

Fuel Assembly Overview

FIG. 1 illustrates a fuel assembly 100 as may be employed in some embodiments. Nuclear fusion occurs when two or more atomic nuclei collide at high speeds to form a new type of atomic nucleus (e.g, the collision of two hydrogen nuclei to form helium). In some embodiments, a cylindrical pellet may be used at the fuel cell. Nuclear fusion resulting from the collision process releases energy which may be harvested, e.g., using steam turbines or other known methods. The conditions necessary to produce nuclear fusion can be difficult to produce. Intense energy and pressure is necessary before the fuel material will begin to collide so as to initiate fusion. However, the application of great energy to perform this compression may itself impart thermal motion to the fuel's atoms, thereby driving them farther apart. To counteract the expansion effect, the fuel is often placed in an extremely cold environment and the compression energy is imparted extremely quickly and with considerable magnitude so as to compress the fuel before thermal expansion occurs. Fuel can be provided in discrete pellets that are positioned one-by-one to receive the energy for compression and ignition. Some or all of the fusion fuel may be in the solid state when delivery of the compression and ignition energy begins. In some situations, the most practical fusion fuels are isotopes of hydrogen and cryogenic temperatures are needed to solidify the fuel. In these situations, the fuel must be enclosed in an extremely cold environment (e.g., to prevent premature vaporization, expansion, and ruination of the designed pellet geometry).

To accomplish these conditions, some embodiments contemplate an assembly 100 that places the fuel 115 at the center of a cooled, cylindrical casing of layers of high density material (e.g., lead) 140 which is bombarded by beams of high energy heavy ions, such as long range ions 110 and short range ions 120 (though a cylinder is depicted here, other shapes, such as a sphere, may be used in some embodiments). The high energy long range ions 110 and short range ions 120 can be delivered in equal beams to each end with extremely high power and energy to create high pressure in the casing materials to drive the fuel 115 inward. The short-range ions 120 may impact caps 145a-b, to drive a quasi-hemispherical compression of the fuel material 115 in the end regions. Long-range ions 110 may penetrate an absorber layer 130 to create high pressure that expands and moves a pusher layer 135 to compress the fuel, while outward expansion of the absorber layer can be resisted by the inertia of a tamper layer 125. The entire assembly may be on the order of 1-3 centimeters in length and 1 centimeter in radius. This example depicts a "holhraum" pellet, though other pellets may be used in other embodiments as recognized in the art. For example, may embodiments instead use a "spherical" pellet (sphinctering and compression may occur in a spherical pellet just as in a cylindrical pellet).

Ions are arranged in some embodiments to impact the layers such that Bragg peaks 150 result "sphinctering" the fuel at a waist region, facilitating ignition. Particularly, in some embodiments quasi-spherical implosions are achieved at the ends of the cylindrical fuel pellets by selecting isotopes so that the higher energy deposition density at the Bragg peaks 150 will drive "waists" (e.g., the sphinctering of the cylinder inward towards the longitudinal axis) to complement the quasi-spherical implosion of the end caps, as in FIG. 1.

Heating symmetry may be provided by 1 GHz circulation of beams around the annular absorber layer 130, with time varying radius of the "hollow" beam. In some embodiments, the hollow beam may resemble a flying helical spring, shrinking radially along the surface of a cone. The relative modesty of the 100 g/cc density of the fuel material of embodiments employing a cylindrical fuel source may be tempered by the higher convergence of cylindrical symmetry compared to spherical compression to a given density.

For increased pellet gain fusion yield, and overall confidence ignition, various embodiments propose a means to sequester the fuel near the end caps 145a-b that is slated for fast ignition. For efficient use of the beam energy, short-range ions 120 may be used to heat appropriately shaped, thin end caps 145a-b with a distribution of heat energy that can drive a quasi-hemispherical compression at these ends in some embodiments. Various embodiments extend this to quasi-spherical compression in the fast ignition zones by driving waists in the cylinder at locations about twice the initial fuel radius in board from the end caps 145a-b. In some embodiments, the rapid rising temperature after fast ignition will intensify the propagating burn and promote propagation through the waists toward the large mass of fuel in the center section.

Figure 2:
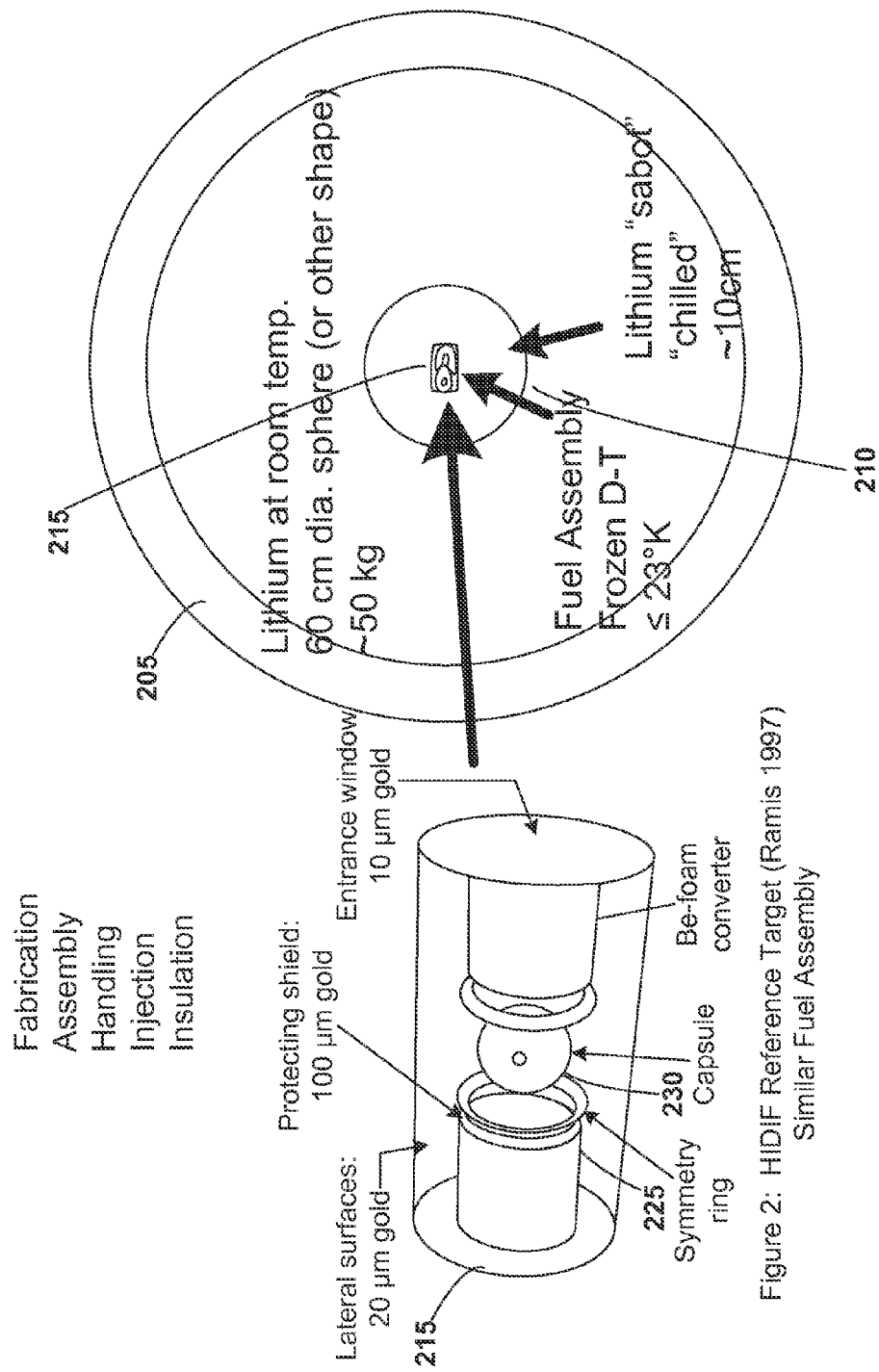
FIG. 2 illustrates a perspective view of a fuel assembly as may be employed in some embodiments.

FIG. 2 illustrates a perspective view of another exemplary fuel assembly 215 as may be used in some embodiments. Here a spherical fuel capsule 230, rather than a cylinder is used, though ions entering at each end of the assembly 215 are again used to compress the fuel material. The assembly 215 may be immersed within a lithium chilled "sabot" 210 which may itself be contained within a lithium volume 205 at room temperature.

Achieving the desired characteristics of the ion beams is very important to initiating fusion (e.g., the density and temporal profile of power and energy deposited in specific regions of the pellet casing). The ions may be accelerated by a linear accelerator and subsequently compacted in space and time by beam handling processes generically called "manipulations" prior to impacting the fuel so as to achieve the desired temporal and spatial heating characteristics.

Braggs Peak Considerations

Some embodiments contemplate means to sequester the fuel at the fuel ends slated for fast ignition. Driving the end caps with short-range ions can allow compression to be quasi-hemispherical. Some embodiments extend this to quasi-spherical in the fast ignition zones, by driving waists in the cylinder at locations about twice the initial fuel radius inboard from the ends.

The use of Bragg peaks to promote quasi-spherical compression in the fast ignition zone presents a method where large advantages may accrue through exploitation of multiple isotopes. Such potential advantages can include reducing convergence in the fast ignition zone, from ~18 for cylindrical to ≤10 for quasi-spherical compression, and reducing the necessary density of the bulk of the fuel to that which will support burn propagation from robustly burning ends.

Regarding the use of Bragg peaks to drive waists (e.g., to drive the fuel inward), FIG. 14 depicts placement of the Bragg peaks of groups and isotopes within groups. Different isotopes may be used to adjust the shown placements. The Bragg peaks of different isotopic slugs may be located at different axial locations in the pellet, e.g., at the end of the different ranges of the different isotopes due to their different energies.

The isotopes can be chosen so that the ranges serve different purposes in driving the pellet, e.g.: 1. Compress the barrel of the pellet: range~equal to the length of the barrel; 2. Drive the end caps in a hemispherical compression: range <thickness of end caps; 3. Drive the "wasp-like" waists to sequester fuel for the end regions, where fast ignition will occur, and drive the other half of the compression of that fast ignition fuel in a quasi-hemispherical fashion, which may work with the quasi-hemispherical compression of the end caps to achieve a quasi-spherical compression, which may help to avoid excessive convergence (which may lead to failure of NIF to ignite); 4. Heat the necessary (relatively small, e.g., if pre-compressed) amount of fuel needed to ignite a propagating burn but every isotope may pile into the fuel mass, even though some isotopes may spread their energy over more than just the "blasting cap" mass.

Plant Topology

Figure 3:
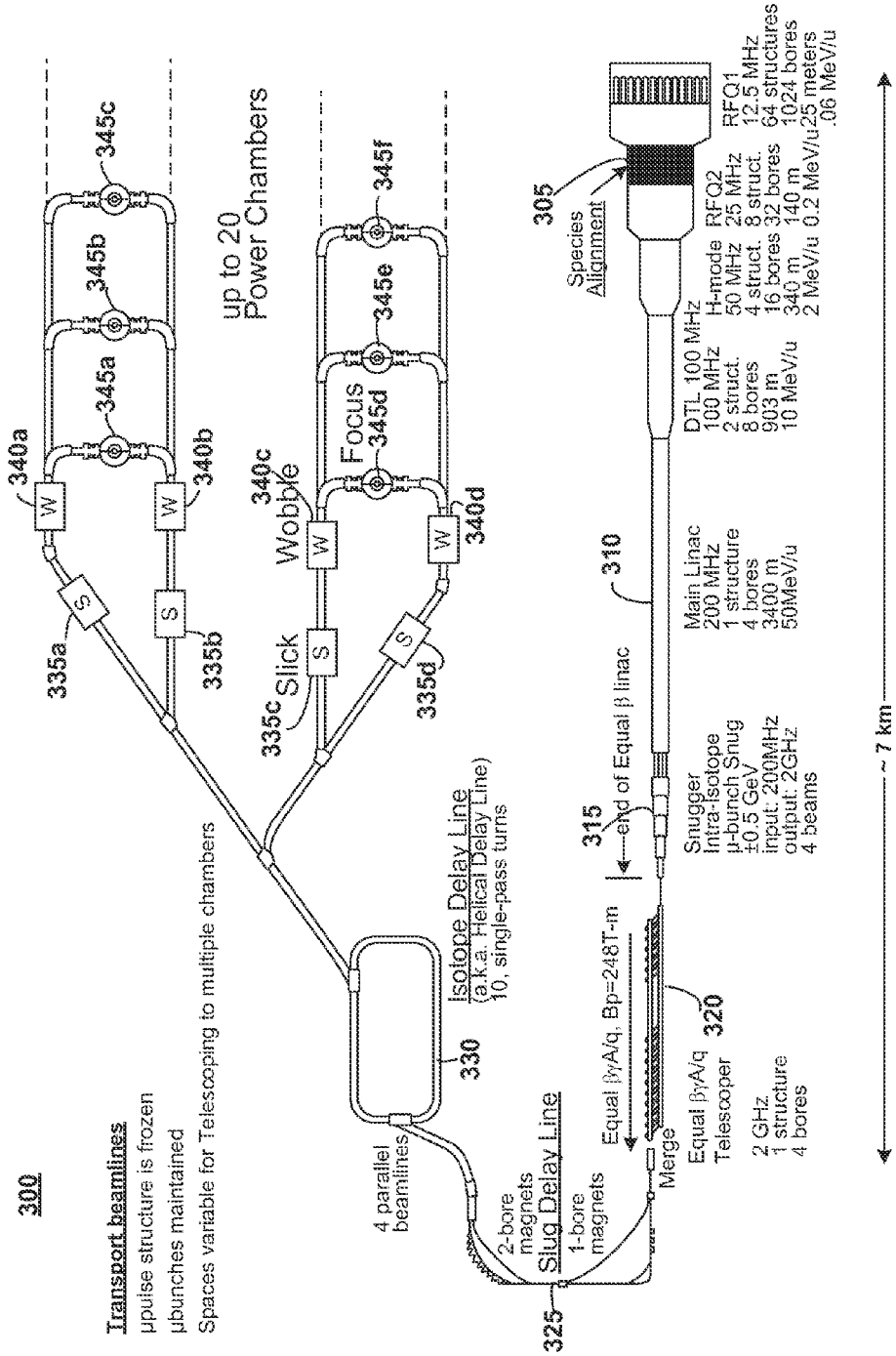
FIG. 3 illustrates a general layout of components in a heavy ion driven fusion energy complex implementing a Single Pass RF Driver System (SPRFDS) as may be employed in certain embodiments.

FIG. 3 illustrates a general layout 300 of components in a power plant implementing a SPRFD system as may appear in certain embodiments. The different ion species can be emitted from separate ion source into parallel beamlines, accelerated by high voltage DC in the parallel beamlines, and converted (by "RF capture") into strings of discrete microbunches in the first RF accelerator section, where the microbunches may move at the speed of the nominal ion. As the same-species group together, they form "microbunches". Microbunches may be transmitted together in successive iterations, known as "slugs". For example, four slugs may be transmitted, each slug containing 10 microbunches of 10 different ion species (thus, 40 microbunches are transmitted in total). The slugs may themselves be grouped prior to impacting the fuel, or may be arranged to impact successively.

After RF acceleration gives the ions a substantial speed to facilitate control by magnetic fields, the beams of microbunches may be aligned into a common beamline at stage 305 before being accelerated through the main linear accelerator 310. Alignment may use pulsed bending magnets operating in spaces between beam sections of different isotopes, said spaces having resulted from the timing of emission from the different ion sources for the different isotopic beams. The structure of each isotopic beam section may also contain time gaps that will later be used to manipulate sub-sections of each isotopic beam, e.g., slugs. The time gaps that separate the slugs (e.g., eight per isotope) may be created by the action on the ions of features provided in the electric and magnetic fields from (and including) the ion source up to the aligner stage 305.

Ions of different species may be accelerated at different speeds. As the same-species group together, they form "microbunches". In some embodiments, ions of different species are accelerated to the same speed at every station along the main accelerator by appropriate adjustment of the amplitude of the accelerating RF fields. The time interval needed to adjust the RF field amplitude can be provided by causing a beam to be emitted from the different isotope source in a specific time series. This can result in the beam sections of the different isotopes being staggered in the parallel beams up to the aligner.

Microbunches may be transmitted together in successive iterations, known as "slugs". For example, four slugs may be transmitted, each slug containing 10 microbunches of 10 different ion species (thus, 40 microbunches are transmitted in total). The slugs may themselves be grouped prior to impacting the fuel, or may be arranged to impact successively.

Following acceleration, a snugger 315 may move the microbunches closer together within the slug. The snugger may bring the microbunches closer to a single position in each slug (e.g., the slug's center of mass). A "snugstop" may also be used to lock microbunch spacing for transport across various distances to multiple chambers. In some embodiments, the snug-stop removes the ordered, differential, microbunch-to-microbunch energy/momentum/speed differences. In some embodiments, snugging and slicking comprise a single operation and there is no longer a snug stopper.

The slugs may then travel through a telescoper 320, slug delay line 325, and isotope delay line 330, to bring the slugs in closer proximity with one another. In some embodiments, the plant includes many fuel assemblies in different focuses 345a-f. The slugs may be passed to these assemblies after travelling through a slick 335a-d and wobbler 340a-c. The telescope may be used to accelerate the different isotopic species to the different speeds that will give all isotopic species the same magnetic rigidity. The function of the merge is to reduce the number of parallel beams in anticipation of the reconfiguration to follow in the slug delay line. The merge may increase the transverse phase space in order to maintain the longitudinal phase space within budget. The slug delay line 325 may be used to progressively switch successive slugs of each isotope so that the single beam comprising multiple slugs (e.g., eight) from the merge is converted into multiple parallel beams in separate beamlines (e.g., sets (e.g., two) of four slugs).

The isotope delay line 330 may remove time gaps, which were enlarged by the foregoing manipulations, between slugs of different isotopic species. The time gaps between isotopic species after the isotope delay line may be such that the different speeds of the different isotopes will result in the slugs of different isotopes arriving at the fuel pellet according to the schedule designed for pellet compression and ignition. The variation in these time gaps to accommodate different overall length of beamline to the multiple chambers can be provided by timing of the pulsed emission from the ion sources for the various isotopes. The slugs may be passed to these assemblies after travelling through a slick 335a-d and wobbler 340a-c. The slick may be used to bring the microbunches of the slugs close together, overlap to various bunches as desired, and shape the bunches in time to build the desired pulse shape in three spatial dimensions and time. In some embodiments, the plant includes a number of fusion power chambers 345a-f, in which the operations may be identical or may be different with correspondingly different beam parameters established by corresponding pulse-to-pulse operation of the various ion sources and beam manipulations Overview of Components for Microbunch Manipulation—Telescoping, Snugging, Slicking, etc.

Telescoping can be a very powerful feature for getting ions into the assigned small volume and mass of the target in the short time demanded. Telescoping may adjust the accelerating gradients in the linear accelerator so that all isotopes have the same given speed as they pass a given spot in the linear accelerator. This can allow one linear accelerator to accelerate all the different isotopes. The last stage of the linear accelerator can have successive "off ramps" where each isotope is diverted into a "common magnetic rigidity" beamline (e.g., telescoping beams).

The timing of the different isotopes can be such that they all arrive at the pellet at the same time, ±a fraction of a nanosecond. The telescoping system can be synchronized by the RF fields over the whole 20+km construct.

At a high level, a slick is a snug without a snug stop. Differentially accelerated microbunches may keep getting closer and may even start overlapping. Each microbunch elongates as a result in part because of the spread of momentums in each microbunch. The second elongating effect of the microbunches can be due to the space charge forces: ions at the front tip of a microbunch are sped forward, etc.

Snugging and slicking can include differential acceleration from microbunch to microbunch within a slug. A slug may alternatively be referred to as "a macropulse of micropulses of a given isotope." The general difference between a snug and slick operation, as discussed in various places herein, is that when a snug is used independently of a slick, the snug is intended to be "partial", e.g., the microbunches do not overlap and interpenetrate—they just become closer together. In that case, there will be km more of beamline before the pellet. In such a case, the several percent differences in energy/momentum/speed can be removed at the end of the snug to "freeze" the microbunches in their relative positions, which can be closer together after the snug than before being snugged. The "stand alone" snug (e.g., Snug alone=Snug+Snug Stop) may require a substantial length of accelerator to remove the energy differences input to produce the snugging effect.

Another reason for delaying the Snug and incorporating it into the Slick can be the higher space charge forces that result when the microbunches are squished into smaller groupings in three dimensions (in the moving frame of reference).

This latter consideration can be accommodated in some embodiments by integrating a snug with a slick, and the microbunches are longer (more spread out in space) with lower space charge fields until the slick. A further effect may be to allow the stretching of microbunches as above can reduce the space charge forces. This effect can be counterintuitive when the intent is to compact the beam.

In some embodiments, the net effect of the set of operations becomes greater than the sum of the parts. The drop in peak current of the microbunches can be overcome when they slick into a pileup (in three dimensional space and time) while "sliding over each other" in the longitudinal phase space (e.g., the distribution of the relative momentums of the ions vs. their relationship in time).

The parameters for slick can be derived by requiring that the microbunches not be longer than needed to play their part in building the overall driver pulse power deposition in the pellet in space and time. For instance, in some situations the start of the Slick cannot be too far from the pellet, or the individual microbunches will stretch too far and lose the peak power they need to have at the pellet.

Differential acceleration of microbunches can be effected by offsetting the frequency of the slick or snug RF cavities. By decelerating the first microbunches more than successive microbunches less (e.g., by more or less linear progression of Slick/Snug "kicks") the RF wave completes less than a full cycle from the time that one microbunch passes through to the time that the next microbunch passes through. The term "bunch frequency" may be used herein to refer to the rate of passage of bunches vs. the RF frequency of the accelerator structure. Within a Snug/Slick, the bunch frequency can be higher than the RF frequency. If there are Snug Stop accelerator section in an embodiment, its frequency can be less than the bunch frequency.

Microbunch Structure

Figure 4:
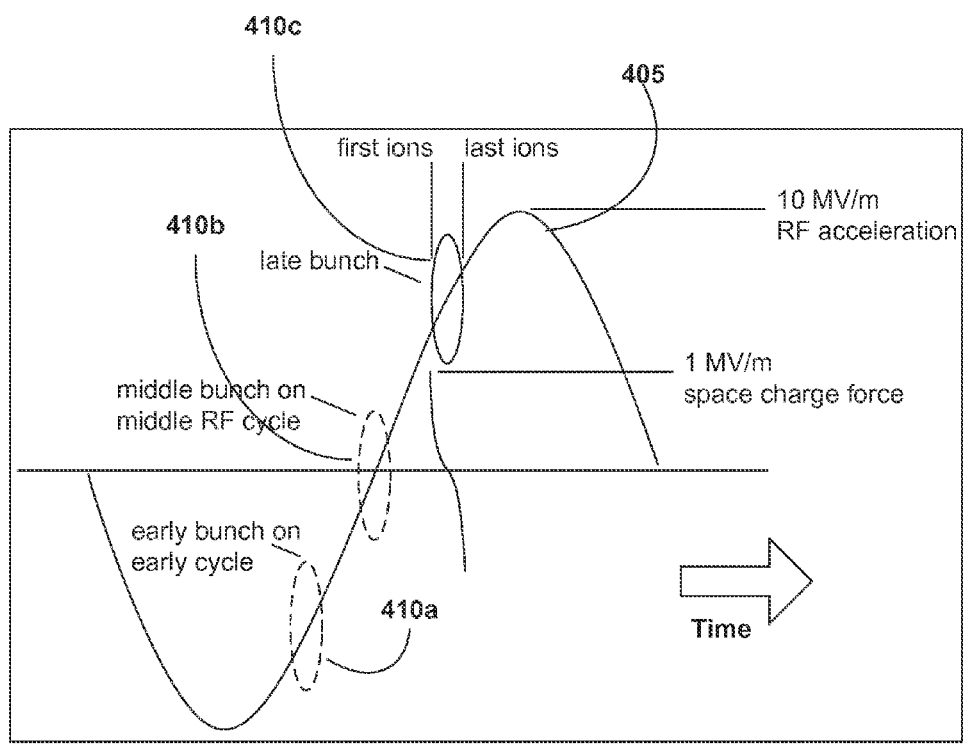
FIG. 4 is an abstract depiction of a microbunch in relation to an electromagnetic wave as may be produced in certain embodiments.

FIG. 4 is an abstract depiction 400 of the longitudinal phase space of various microbunches 410a-c in relation to an electromagnetic wave 405 (e.g., an RF wave) as may be produced in certain embodiments. Here the horizontal axis depicts time. A microbunch may be a collection of ions in the same isotope species, e.g., as discussed above. In some embodiments, amplitude modulation of the wave is a means to shape the power of each slug upon impact. The sum of the shapes of individual isotopes in the three spatial dimensions and time may be used to build a detailed driver profile. Together a string of microbunches 410a-c may comprise a "slug" and a section of the beam of an individual isotope may comprise a series of "slugs. Upon the same waveform 405 may reside an early microbunch 410a, a middle bunch 410b, and a late bunch 410c. Each ion species may possess a different weight (e.g., different neutron count) and may be accordingly accelerated at a different rate.

To allow precise control of timing, the beam structure of discrete microbunches may be maintained by applying suitable RF fields during the beam manipulations that follow the principal RF acceleration, which inputs the beam energy. The frequency of microbunch-maintaining RF field determines the length of the microbunches, which can have significance for the number of ions that may be transported in each microbunch. In one example, microbunches are transported at 800 MHz. With each microbunch comprising an efficacious number of ions (where the total beam for an effective compression and ignition pulse may comprise, e.g., 160,000 microbunches at the first RF accelerators of all beamlines, becoming 40,000 microbunches after a four-fold, e.g., merge), the space charge field at the tips of the microbunches will be of the order of 1 MV/m, which may be a fraction of the RF field gradient (10 MV/m) attainable in RF cavities operating at 800 MHz, and therefore may be transportable without deleterious effects on the beam quality (phase space). Beam neutralization may be needed after the differential acceleration until adjacent bunches begin to overlap.

In one example, microbunches are transported at 800 MHz, which results in the space charge field at the tips of the microbunches being 1 MV/m, which may be a fraction of the RF field gradient (10 MV/m), through beam compaction processes upstream from the differential accelerator.

In some embodiments, the merge shines four beams into the same space. This can increase the transverse emittance because of the required angular difference in the directions of the merging beams. Larger emittance may mean larger spot size on the pellet, which means less intense heating, etc. Accordingly, some embodiments seek to reduce emittance.

In some embodiments, the permissible amount of microbunch lengthening is set by the design pulse shape at the pellet, which may vary for different groups of isotopes. As one possible example, the various isotopes can be selected in groups that have narrow bands of ranges (stopping distances in the target). For the overall set of isotopes of the various groups, the ranges may extend from 1 to 10 g/cm$^2$. The ranges of the isotopes within the various groups can be selected to drive the cylinder barrel (longest ranges) and thin hemispherical endcaps (short ranges), to heat the 0.5 g/cm$^2$ $\rho$R fast ignition zone (where $\rho$ is the fuel density and R is the radius) at the culmination of the compression and ignition process.

In some embodiments, the ranges of designated groups of isotopes can be selected so that the end of their ranges fall at designed axial stations, within a distance of each other, part way toward the midplane of the cylinder from each end. With such selection of ion ranges, the Bragg peaks at the end of the ranges can increase the specific heat deposition density, which in turn can create higher pressure than in adjacent material, which in turn will accelerate the implosion of the cylinder at these axial stations. In this manner, the accelerated implosion can drive an annular wedge or waist, forcing the affected pusher and fuel material either toward the cylinder midplane or toward the cylinder ends. Driving such waists at appropriate axial stations may work in conjunction with the hemispherical implosion of the endcaps to achieve quasi-sphericity of the compression of the fast ignition zones at the pellet's ends. To the extent the resulting implosion of the end zones approaches spherical, the convergence factor (ratio radii of fuel before and after compression) can be reduced from that required for simple cylindrical compression. A low convergence factor may be desirable as it is a primary metric for susceptibility to hydrodynamic instability of the implosion.

Such lengths may improve the quasi-sphericity of the compression of the fast ignition zones at the pellet's ends. In some embodiments, momentum differences between microbunches are input in a correlated and time-ramped fashion to contribute to beam compaction. Beam line transport elements with time-ramps located close after the differential accelerator geared to the ramped momentum differences may be used to compensate the normal effect of ions with different momenta to focus with different focal lengths the associated shifts of focal point. To accomplish this compensation on the desirable microbunch-to-microbunch basis, the compensating fields may be applied before the microbunches overlap substantially. Thus, the dynamic beam line elements may be located suitably close after the differential acceleration.

In some embodiments, momentum differences between microbunches are correlated and time-ramped. Beam line transport elements located close after the differential accelerator may be used to correct the associated shifts of focal point. Beam neutralization may be needed after the differential acceleration until adjacent bunches begin to overlap.

In some embodiments, concurrent collapse of each isotope and telescoping of the isotopes may cause the current in each beam line to rise rapidly during the final microsecond of driver pulse generation.

Microbunch Snugger Interaction

Figure 5:
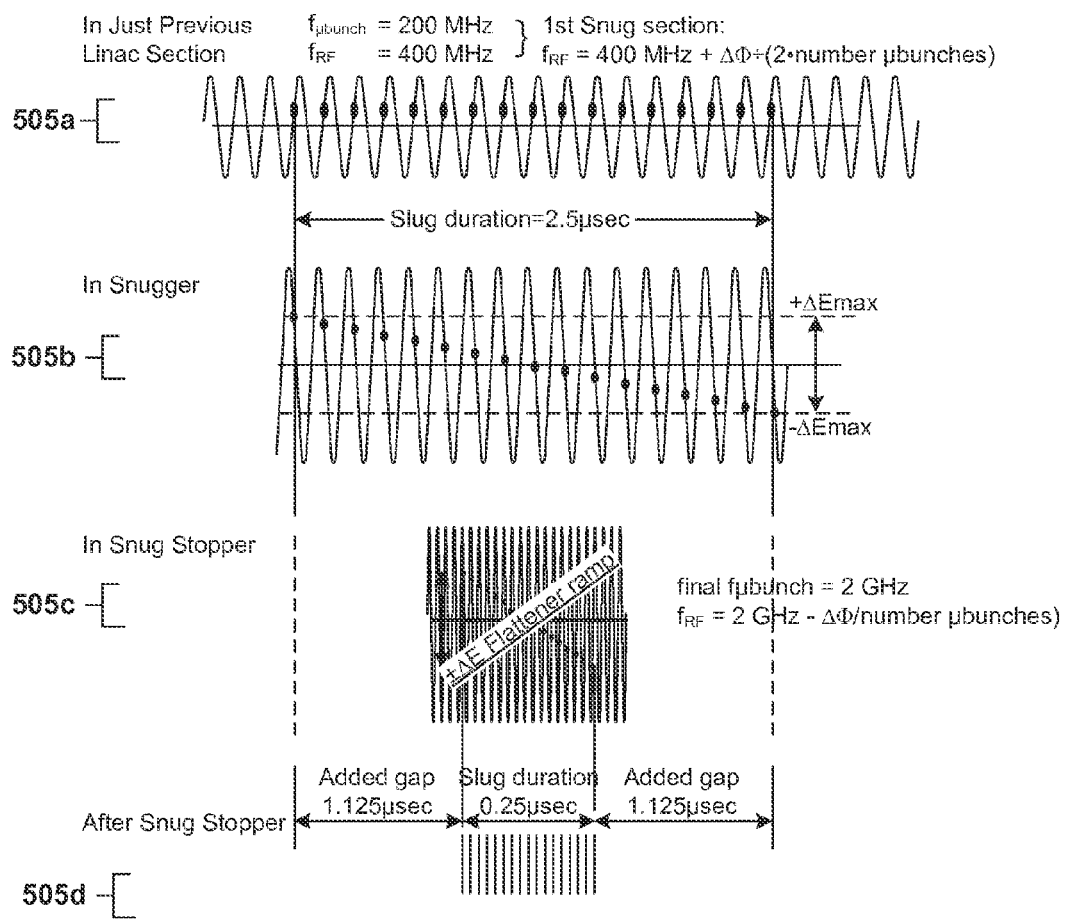
FIG. 5 depicts a plurality of microbunches before the snugger, in the snugger, the snug stopper, and after the snug stopper as generated in some embodiments.

FIG. 5 depicts a plurality of microbunches before the snugger, in the snugger, the snug stopper, and after the snug stopper as generated in some embodiments.

The snugger and the slicker may both be RF accelerator "structures" (cavities/resonators/etc.) whose resonant frequency may differ (e.g., about 0.1% or so in some embodiments) from the frequency with which microbunches arrive and pass through. The effect can be for successive microbunches to fall on different phases of the RF wave, either more deceleration/acceleration or less: decelerated microbunches fall back toward the center microbunch, and trailing accelerated microbunches move toward the center microbunch.

Figure 17:
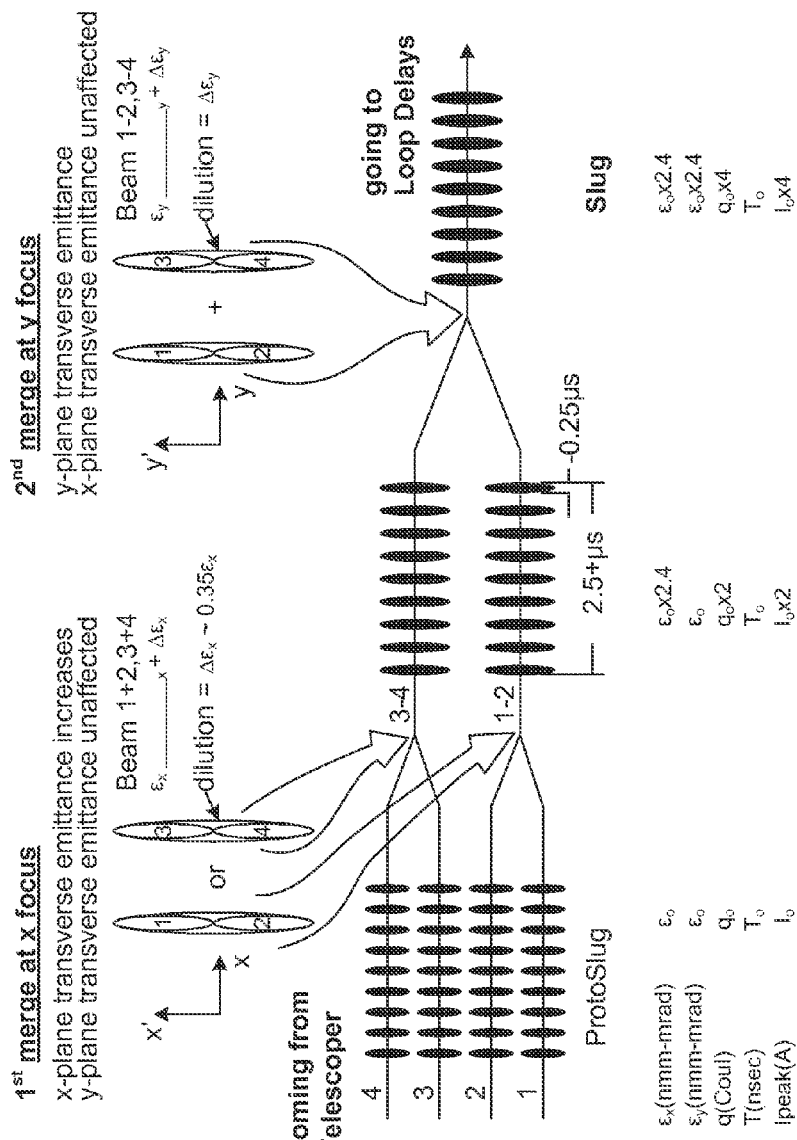
FIG. 17 depicts merging of beams in parallel linear accelerators from four beams in parallel beamlines to one beam, by a successive merges in each of the two planes of the transverse phase space as may occur in some embodiments.

In some embodiments, the temporal structure of the slugs is established in the snug process, which moves microbunches closer together than emitted from the main linear accelerator, squeezing each microbunch in longitudinal phase space. In some embodiments, the compressed microbunches became the completed slugs when four parallel beams from the linear accelerator are merged, two by two, in transverse phase space (e.g. as depicted in FIG. 17). This slug structure may be preserved, along with the phase space of the individual microbunches, by the continuation of phase focusing, through delay lines and beam transport up to the slick.

In some embodiments, the finest timing for the schedule of arrival of different isotopic slugs at the pellet may be obtained by RF synchronization. Microbunch timing may be controlled in the beamlines between the linear accelerator and slick by RF sections that also maintain the longitudinal phase space by inverting the longitudinal phase space ellipses at intervals along the beam path. The microbunch slug structure within a slug may be preserved, along with the longitudinal phase space of the individual microbunches, by the placing RF cavities at specified intervals along the beam path, through delay lines and beam transport up to the slick.

In some embodiments, this microbunch maintenance can be provided by cavities having RF frequency equal to the frequency of arrival of the microbunches and maximum applied RF voltage equal to twice the difference of the maximum (or minimum) momentum from the nominal. The cavities can be placed so as to act on each microbunch when the momentum spread of the ions in a microbunch has caused its longitudinal phase space ellipse to shear to a specified maximum length and time duration. This may be set by the period of the RF cavities and the maximum phase angle of the RF wave. These cavities may accommodate the natural shearing by inverting the longitudinal phase ellipses for each microbunch. The phase space ellipse may then resume shearing, starting from a "backward" tilt and proceeding until the tilt is again the maximum in the "forward" sense, where it will again be inverted by the next set of RF cavities.

In some embodiments, the timing of the end product slugs may be too coarse relative to the precision of the pulse timing and power profile needed at the fusion pellet. For example, the precision ultimately available is determined the accuracy of RF phase control (e.g., $\pm 1E-3$) of the RF period at the highest frequency used (e.g. 800 MHz), which would be $\pm 0.00125$ nsec. This precision may depend, however, on the timing of the reference microbunch, which is identified at the frequency of RF capture in the first RF accelerator section, where the precision would be $\pm$one-half of that RF period. For example, at 12.5 MHz the initial timing precision of the reference microbunch will be within the bounds of $\pm 4$ nsec. This would be more than ten times coarser than needed for some aspects of the pellet implosion, especially in regard to fast ignition. Using non-intrusive beam observation methods to track the reference microbunch through the series of frequency doublings in the linear accelerator, it is possible to determine the divergence of the timing of the reference microbunch from its specified timing. To bring the timing of the reference microbunch (and thereby the entire slug) much closer to that ultimately possible, for example $\pm 0.00125$ nsec as possible at 800 MHz, tbaseline of the snug's offset-frequency RF may be adjusted according to the need of each individual isotope as depicted in the dashed lines 605 on FIG. 6. As a result, in some embodiments the slug will move either closer to or farther from its neighbors at the same time that its microbunches move closer together.

In some embodiments, snugging reduces the time gap between successive microbunches by differential acceleration whereby the first microbunch of a Slug is decelerated the most, the last microbunch is accelerated most, and the first half of the microbunches are decelerated progressively less and those in the second half are accelerated progressively more. The differential acceleration is accomplished by RF accelerator cavities whose resonant frequency differs by a precise, small amount from the frequency of arrival of the discrete microbunches. Frequencies of the RF cavity less than the microbunch arrival frequency may result in the RF field completing less than a full cycle between microbunches, causing successive microbunches to "walk up" the RF wave.

To enable transport of the beam after the snug with microbunch structure intact and acceptable momentum differences, the differences between the speeds and momenta of successive microbunches may be removed when the desired degree of snugging has been achieved. This snug stop can be accomplished by RF cavity frequencies larger than the microbunch arrival frequency, causing successive microbunches to "walk down" the RF wave, from maximum acceleration of the first microbunch to maximum deceleration of the last. The total of the differential acceleration for each microbunch can be exactly opposite to that of the Snug, but Snug Stop operates on microbunches that arrive at the higher frequency resulting from having been Snugged closer together in time.

Figure 6:
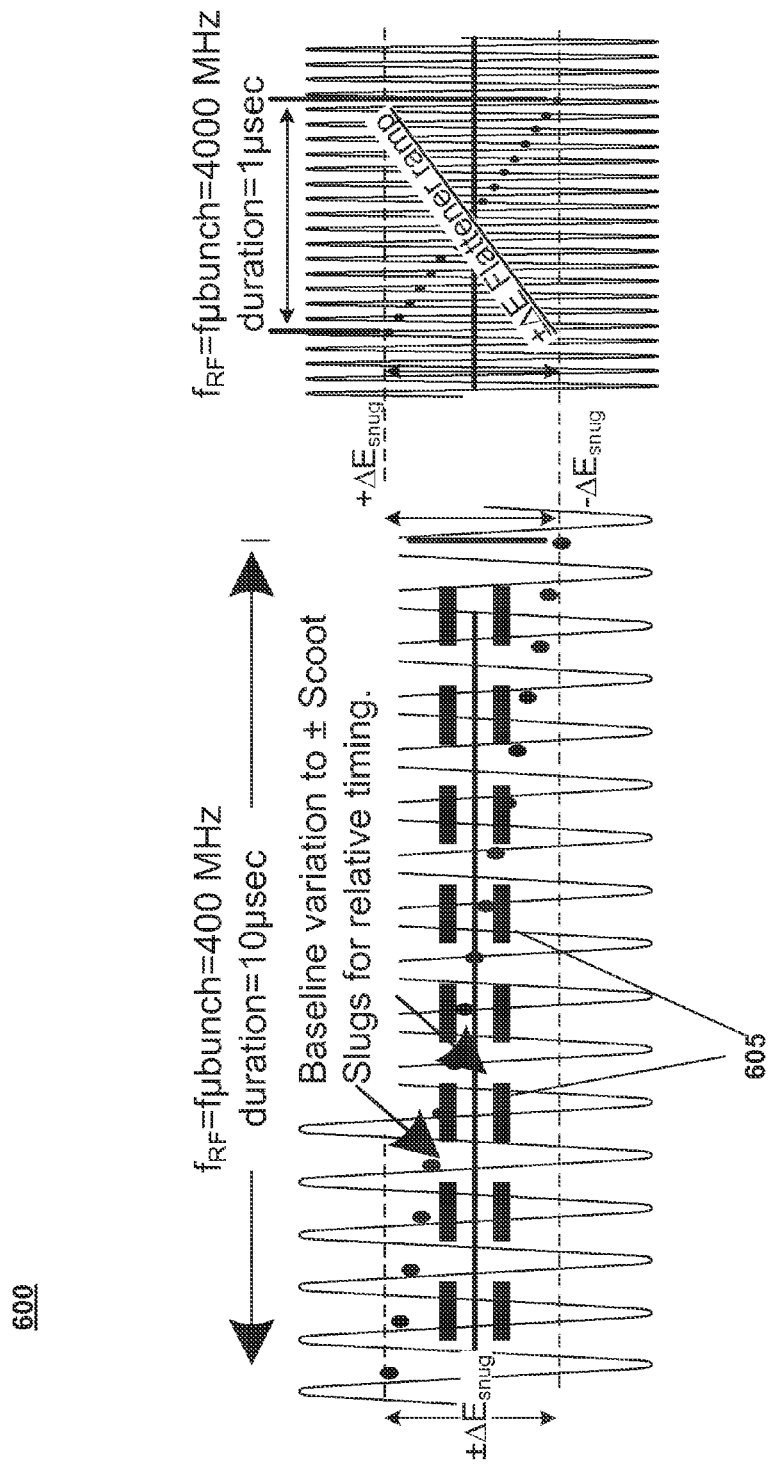
FIG. 6 depicts a plurality of microbunches as may be adjusted in some embodiments.

FIG. 6 depicts an example plurality of microbunches to represent a slug as they receive the differential acceleration to drive the snug process (left side of figure) and as they receive the equal and opposite differential acceleration to stop the snug process (snug stop) when the microbunches are closer together at the end of the snug process as used in some embodiments. The figure also shows (dotted lines 605) the raising or lowering of the baseline of the differential acceleration that may be used to move the slug as a whole forward or backward relative to its neighbors to correct the relative timing between slugs and achieve the high precision possible with RF phase control at the higher frequencies of the RF field and microbunch arrival.

Following the slick linear accelerator section and until reaching the pellet, the momentum spread within each microbunch may cause the microbunch to stretch in time. Space charge may tend to increase the elongation, but the initial effect on every microbunch may wash out (except for the ones on the extreme ends of slugs) when consecutive microbunches overlap. This may occur rapidly because of the bunches' close spacing at 2 GHz.

Microbunch Slick Interaction

In some embodiments, the slick is the last accelerator process to work on individual microbunches. In some embodiments, the slick differentially accelerates microbunches within each slug so that the leading microbunches slow down and the trailing microbunches speed up.

In some embodiments, to snug or slick, successive bunches receive less and less deceleration until the zero crossing and then receive increasing acceleration. This can mean the RF cycle is longer than the time between microbunches. A snug stop may reverse these features: the first bunch accelerated most and the last bunch decelerated most. Many embodiments omit the use of a snug stop and in some embodiments, snugging and slicking operations are approximately the same.

Figure 11:
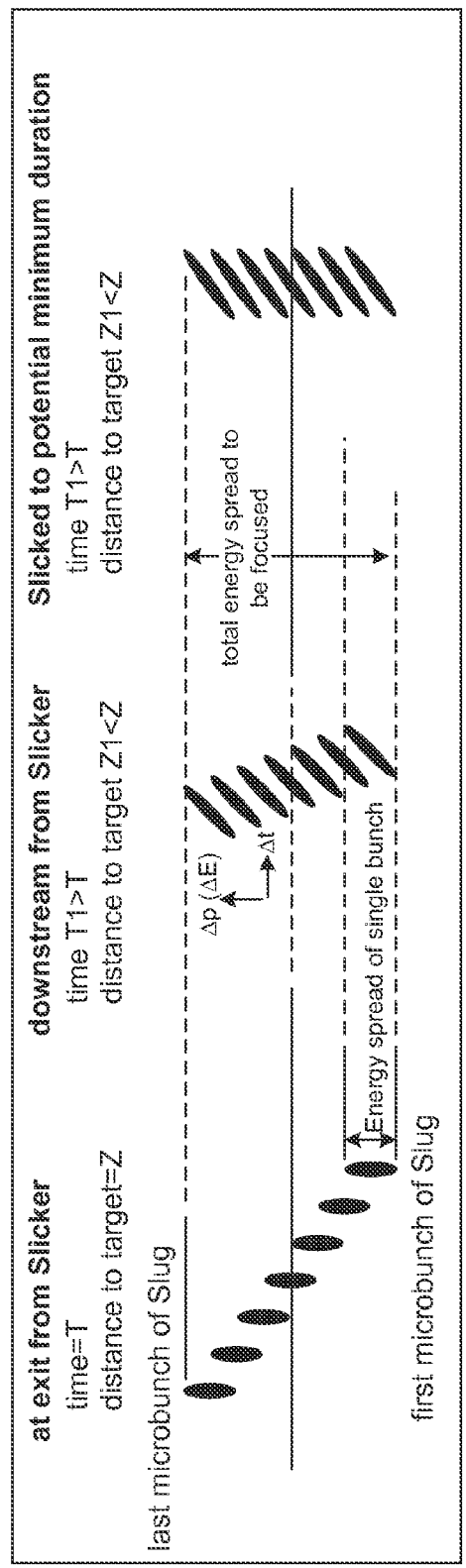
FIG. 11 illustrates the motion of microbunches spacing within a slug in the longitudinal phase space (coordinates of momentum and time) early in the slick process and at the fusion fuel pellet as contemplated in some embodiments.

The term "slick" is suggested by the motion of the microbunches for a given isotope as they "slide over" one another in the longitudinal phase space during the approach to the pellet (See, e.g., FIG. 11).

Figure 7:
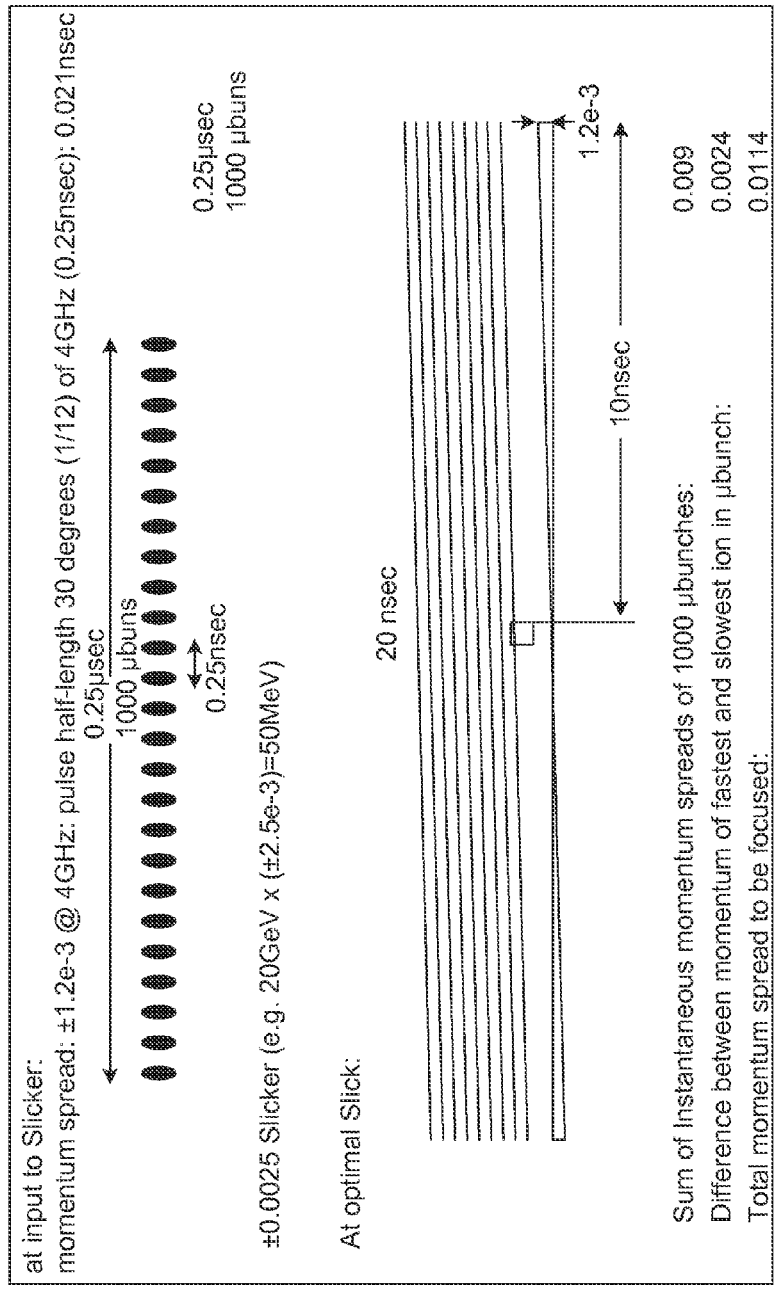
FIG. 7 depicts the condition of the longitudinal phase space ellipses of the microbunches in a slug as they are input to the slick and at one of many possible final states following a slick as contemplated in some embodiments.

FIG. 7 depicts microbunch inputs to the slick as contemplated in some embodiments. For example, FIG. 7 depicts the condition of the longitudinal phase space ellipses of the microbunches in a slug as input to the slick and at one of many possible final states at the fusion pellet resulting from slick as contemplated in some embodiments. The particular final state shown is the case where all microbunches in a slug arrive simultaneously at the pellet. To provide desired temporal pulse profiles, the amplitude of the slick RF may be modulated in a variety of ways.

As discussed herein, some embodiments contemplate substituting storage rings with bunching operations. The organized slugs may then travel by induction cavities with a ramped accelerating field. In the slick, the differentially accelerated microbunches may move with respect to one another in the longitudinal phase space, leaving behind the empty spaces originally between them. The longitudinal phase space per microbunch, as emitted by the linear accelerator may become an asymptotic potential for focusing. The correlation of the momentum differences between microbunches can be used to compensate for differences.

Whether it is SPRFD's microbunches or compression of a single long pulse of beam, a ramped beamline transport component may have similar effects. The final compression by RF "tilting" (e.g., accelerates and decelerates) of the string of microbunches can provide precision timing of RF synchronization. In some embodiments, the pulse shape at the pellet sets the permissible amount of microbunch lengthening in the beam line to the pellet. In some embodiments, the overall duration of the slug at the pellet must fit the part of the pulse that it serves, and the microbunches must be no longer than their respective slugs.

Figure 10:
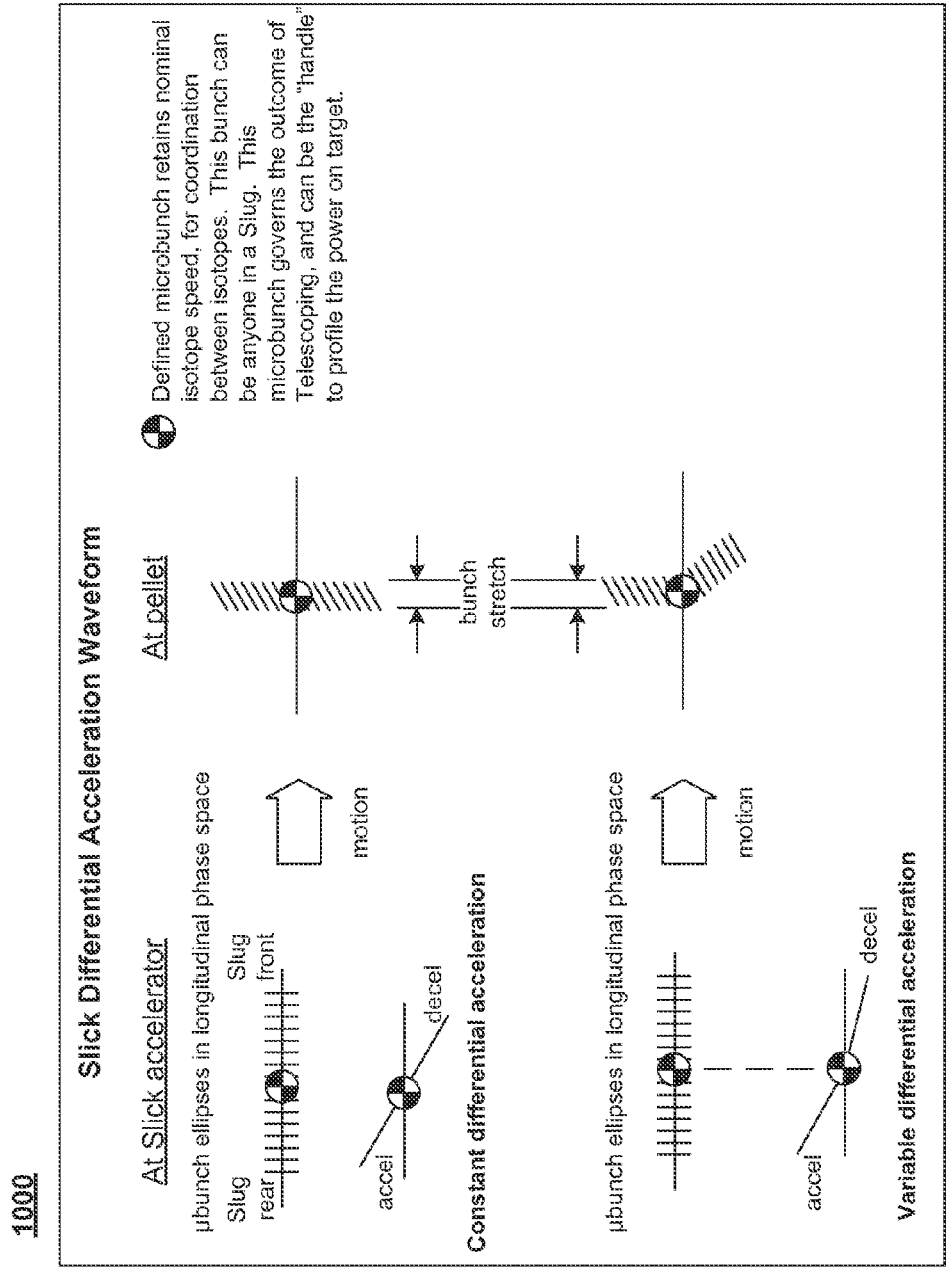
FIG. 10 illustrates modulation of the differential acceleration waveform at the slick as a means to shape the power profile of the beam on the pellet as may be implemented in some embodiments.

Accordingly, the microbunch width may establish the maximum drift distance for the slug and in turn the parameter sets for the initial macropulse durations (thus energy content for each slug), range of momentum/speed/energy kicks, applied RF voltages for each isotope, and many other factors. When the duration of the (former) microbunches is significantly less than the necessary slug duration, modulation of the differential acceleration allows shaping each slug at the pellet, as illustrated in FIG. 10.

For example, each microbunch of the fastest isotope (20 GeVXe) having momentum spread 0.05% (for the SPRFD embodiment with 800 MHz microbunch maintenance), can lengthen to 10 ns during a drift of 3 km. Being both the fastest isotope and serving the longest features of the pulse shape, Xe will have the longest drift distance, and also will contribute the most energy per Slug.

In some embodiments, isotopes are selected for groups, 2-6 isotopes in each group, having narrow bands of ranges suited to different roles in driving the pellet. These roles may include: 1. compressing the cylinder barrel (or spherical chamber); 2. driving the end caps in a hemispherical compression; 3. driving the waists (e.g., the regions along the cylinder following the end caps); and 4. driving fast ignition. The number of ion groups involved may be larger than these functions, and ion groups may be assigned to different functions (or to the same function). The narrow bands may have energies given by the telescoping system of equal magnetic rigidity (e.g., 239T-m for 20 GeVXe-130). These ranges may, e.g., extend from 1 g/cm2 to 10 g/cm2. Xe-like isotopes at 20 GeV drive the 1 cmPb cylinder barrel, whereas Pb-like isotopes at 13 GeV may drive 0.1 cm thick hemispherical Pb end caps. The 1 g/cm2 ranges efficiently heat the fast ignition zone, where $\rho L$ 1 g/cm2 agrees with $\rho R$ 0.5 g/cm2.

To achieve quasi-sphericity of the fuel compression in the fast ignition end zones, in conjunction with the use of short range ions to heat the thin end caps and drive hemispherical compression of the fuel contained therein, Bragg peaks of intermediate range isotopes may drive waists in the barrel near each end of the cylindrical fuel mass to sequester the fuel destined for fast ignition and promote sphericity of its implosion. Compared to cylindrical compression, spherical compression may have the advantage of requiring a lower convergence factor (ratio of the initial to the final radius of the fuel mass) to achieve a given final fuel density, where implosions with smaller convergence ratios are less prone to the hydrodynamic instabilities that spoil the compression process. A Bragg peak refers to the substantially increased rate of energy deposition exhibited by heavy ions near the end of the range, as illustrated, e.g., in FIG. 16. The resultant increased specific heating of the absorber material can result in increased pressure in the vicinity of the Bragg peaks relative to the adjacent material, which can accelerate the implosion at those locations and cause a sphincter-like motion to pinch waists into the pellet.

The ability of the SPRFD to focus to smaller spots than previous HIF driver designs provides a means to avoid the issue regarding the shift of the location of Bragg peak as the absorber material expands, decreasing the material density, and lengthening the distance needed to reach the end the range, which is the product of density times path length. In some embodiments, rather than constantly heating virtually the entire annular absorber, the smaller spot may heat a narrow annulus at any instant. Therefore, whereas the density of a continuously heated absorber mass will drop as the heating causes it to expand, these embodiments' smaller spot may be dynamically aimed, by programming the modulation of the wobbler fields to adjust the radius of the hollow beam, at the inner edge of the annulus that has just been heated, to maintain the track of the ions in material that has had less time to expand so that the ions see a density that remains nearly constant. For example, whereas the radius of the spot of previous HIF drivers is of the order of 1 mm, SPRFD may focus to 0.1 mm radius or less. For the annular absorber, the mass of the heated annulus can be proportional its thickness (e.g., twice radius of the beam spot), and in some situations a beam of a given power will heat an annulus of a given thickness ten times faster than it will heat an annulus that is ten times as thick.

Figure 8:
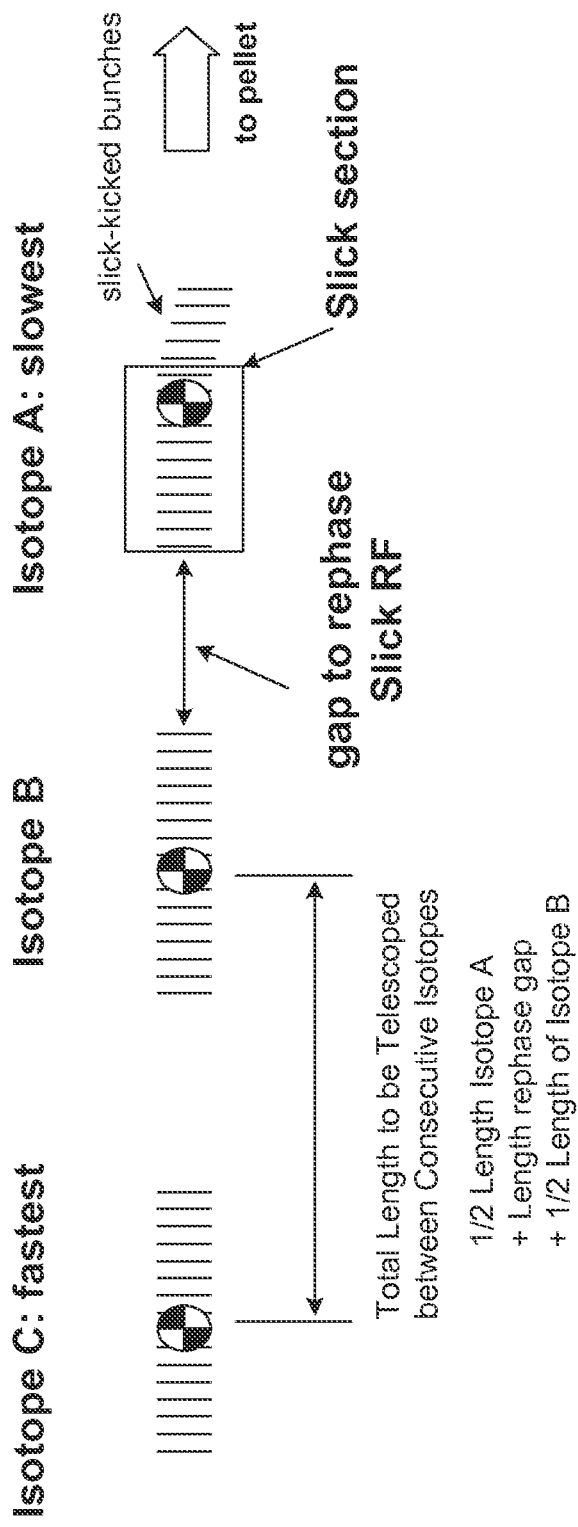
FIG. 8 illustrates a slick operation upon successive slugs of different isotopes as may occur in some embodiments.

FIG. 8 illustrates the formation of a slug comprising multiple groups of microbunch isotopes at the slick as may occur in some embodiments. Particularly, FIG. 8 illustrates some basic considerations regarding design of the Slick operation to accommodate successive Slugs of different isotopes as may occur in some embodiments. In general, the considerations illustrated regard the time factors that set requirements on the maximum length of the slugs, the time between the trailing edge of one slug and the leading edge of the next slug. RF technology may set a minimum time for resetting the phase (rephasing) of the RF cavities in the time between the end of the passage one isotopic slug and the beginning of the next slug. The length of a slug can be an important determinant of the total amount of energy that a slug may carry and deliver to the pellet. The total time between the reference points in the different slugs time may set the distance that the different isotopes may telescope, which, in conjunction with other factors, may set the requirement for the difference in speed between the isotopes. These factors affect the distance from the slicker to the fusion pellet, the amount of differential acceleration that is needed to accomplish the desired slick in the defined distance to the pellet, and other associated parameters. Internal consistency may require, for example, that the desired slick effects and the desired telescoping take place over the same distance.

Figure 9:
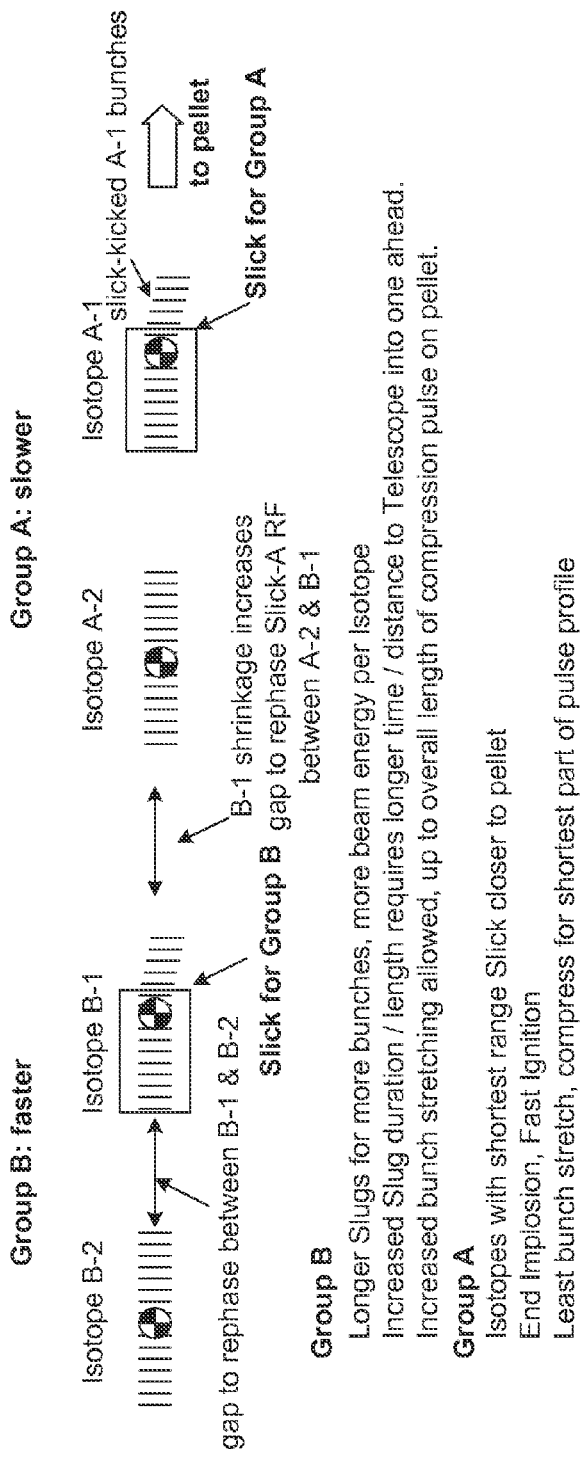
FIG. 9 illustrates the formation of a slug comprising multiple groups of isotopes at the slick as may occur in some embodiments.

FIG. 9 illustrates some considerations regarding application of the slick operation to successive groups of isotopic slugs. The different groups in this example comprise isotopes using a common set of RF slick accelerating cavities. In this manner isotopes in a group have relatively small differences in speed for telescoping may be produced. Different groups of slugs may use different sets of RF slick accelerating cavities to accommodate the need for the period of the resonant RF cavities to correspond to the period between microbunches traveling at the substantially different speeds that characterize different groups. These considerations may include those applicable to slick of different slugs by a single slicker, but also additional considerations, e.g. that the RF fields in a slicker for one group of slugs must be off during passage of the slugs belonging to another group. These factors may determine the locations of the slickers for the various groups of isotopic slugs, and define requirements for internal consistency between the lengths of all slugs, the various distances to the fusion pellets, and others.

FIG. 10 illustrates modulation of the differential acceleration waveform at the slick as a means to shape the power profile of the beam on the pellet as may be implemented in some embodiments. In the example of FIG. 10, modulating the waveform of the slick RF shapes a Slug's profile at the pellet. In the top portion of the figure, application of equal amounts of differential acceleration from microbunch to microbunch results in reducing the distance between successive microbunches by the equal amounts for all microbunches. The figure shows the case where all microbunches arrive simultaneously at the pellet. In a general case, the microbunches may arrive at the pellet with their centers spaced by any constant distance. The bottom figure shows application of a RF waveform comprising two linear portions. The result shown adjacent to the right of that arrangement of waveform and microbunches shows the resulting configuration of the microbunches at the pellet will have two portions. In the result pictured, the microbunches in one portion arrive simultaneously while the microbunches of the portion subjected to a different slope of differential acceleration arrive with some constant distance between centers.

In general, multiple isotopic slugs provide means to shape the power profile on target. Peak power may be the most sought after factor, but efficient implosion may also require matching the input power to the accelerating hydrodynamics and providing an appropriately timed pre-pulse of relatively low power to establish the fuel on a low thermodynamic adiabat. This provides an especially large payoff when the plan uses fast ignition, where different processes are used to compress the fuel and heat only enough fuel to ignition temperature to achieve propagating burn. In general, compression requires more input energy than the energy required to heat the fast ignition fuel mass by means other than the compression itself. Creating the conditions in the absorber that result in the high pressure needed to drive the compression consumes part of the input energy, but much of the input energy also goes into the work of compressing the fuel. The lowest energy to accomplish compression may be when the compressed state is at the lowest temperature. Since the final temperature for any practical compression process will be related to the initial temperature, the least energy to do the compression work will result with the initial temperature being as low as practical.

In some embodiments, the slick input locations are based on the desired speed difference between slugs, the length of slugs going into the slick, and the gap between slugs needed to rephase the slick. The slicks for longer slugs may be placed farther upstream from the pellet than the ones for shorter slugs. A modest number of different slicks, e.g. 3 or 4, may not be a cost problem in some embodiments where the energy kicks are ~10ths of one % of the nominal beam energies, e.g., 50-200 MeV.

In some embodiments, different slicks may be electromagnetically "dead" during transit by the slugs they do not operate on. This timing operation may readily fit into the timing necessitated by other considerations discussed herein.

Some embodiments contemplate rephasing a slick's electromagnetic wave between slugs to shift from acceleration at the trailing end of the preceding slug back to deceleration of the leading end of the following slug. The rephasing requirement may reduce the intervening space between the multiple slugs telescope. In some embodiments, the relationship between the set of isotopes and their lengths before reaching the slick may define the amount of energy that each provides to the pellet.

FIG. 11 depicts microbunch spacing within a slug in relation to a slick as contemplated in some embodiments. In some embodiments, operations at the slick comprise the final adjustments before impact. These operations may begin at the last process that uses the phase space properties of individual microbunches, which have been preserved throughout previous beam operations.

Figure 12:
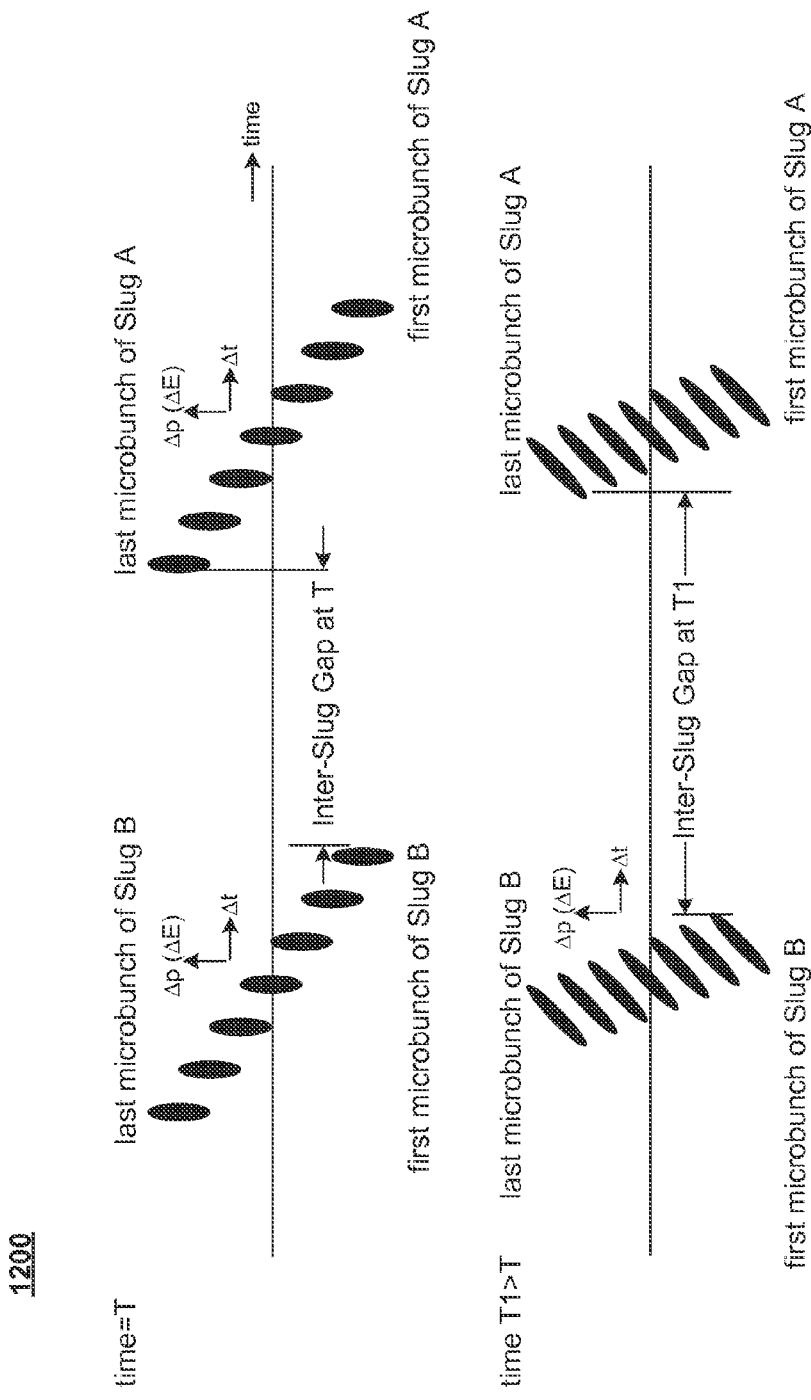
FIG. 12 depicts relative microbunch placement within a slug at various times as occur in some embodiments.

FIG. 12 depicts relative microbunch placement within a slug at various times as occur in some embodiments. Practical beamline lengths may require adequate differences between the nominal speeds of the multiple isotopes. While the speed differences for telescoping may be compensated for by the isotopes' correspondingly different masses, the speed differences may impact the processes that use RF accelerator structures. Linear accelerators may comprise physical structures supporting multiple accelerating gaps with specific distances between them. Since efficient generation of high strength electromagnetic fields for acceleration requires operating near a specific resonant frequency, time required for a particle to move from gap to gap can be similarly restricted, which places a relatively tight requirement on the speeds of the particles. Independently phased cavities provide much greater ability to handle a wide range of ion speeds. With appropriate consideration of cavity rise time, etc., computer control of the phase and amplitude would accommodate SPRFD's needs. While independent phased cavities are unnecessary for the energy-input accelerator including the telescope section, the flexibility of independently phased cavities may outweigh their increased cost for some of the beam manipulations.

In some embodiments, wobbler operation can result in (effectively) hollow beams at the pellet during the early and mid-stages of the implosion. Creating a "hollow" beam may involve introducing perturbations to the beam dynamics that result in the beam spot moving around a ring on the face of the target. Some wobbler designs excite RF structures having much similarity to linear accelerators but are designed to impart periodic transverse accelerations to achieve the desired perturbation of the beam dynamics rather than axial accelerations to add energy to the ions. Other approaches provide the beam-perturbations by different arrangements of electromagnetic apparatus.

In some embodiments, pulsed magnetic beamline focusing elements located immediately after the slick input may be programmed to input progressive adjustments to the composite focal length, which may correlate with the regular progression of momentums from microbunch to microbunch in a slug. In some embodiments, the time for the isotopes to telescope from the slick positions translates to the maximum differential slick kick velocity being within bounds for achromatic correction to mitigate chromatic aberration at the target. However, the discreteness and regularity of the microbunch to microbunch momentum differences lend themselves to the dynamic compensation concept, and more fully compensating the bunch-to-bunch momentum differences reduces the momentum spread toward that of each microbunch, about 0.1% from scaled HIDIF parameters. This value is substantially lower than many previous designs and is an important result of some embodiment's preservation of the microbunch structure.

Microbunch—Pre-Pellet Impact

Figure 13:
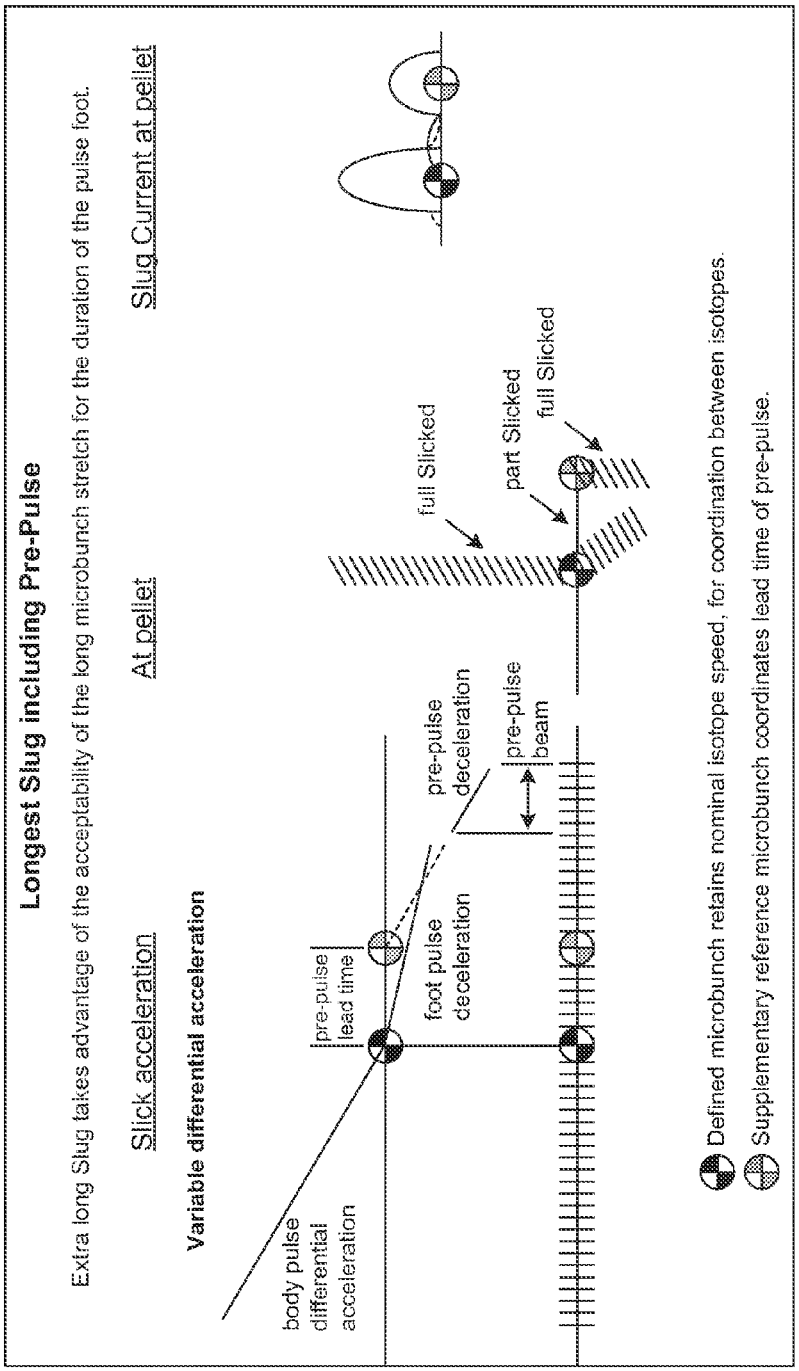
FIG. 13 depicts the further use of modulating the Slick RF waveform to shape the temporal profile of a Slug's power to create a pre-pulse at a pellet as may occur in some embodiments.

In some embodiments, the profile for each isotope is tailored to improve the effective and efficient use of the energy carried by a slug. FIG. 13 illustrates the ability of the slick process to shape the temporal profile of a slug in a variety of ways as may provide important efficiencies in the pellet compression and ignition processes as may occur in some embodiments. The figure shows the slick RF waveform modulated in time to have three different slopes for ease of visualization, although perfect linear waveforms are not required in general and modulations that accommodate practical rise-times, etc. may produce superior results in some cases. As shown, the illustrated modulation achieves a distinct early beam portion (pre-pulse) followed by a portion starting at low power ("foot") and rising to high peak power. Thus, by adding a feature to the modulation, this isotope can contribute power to the foot, and remain on to contribute to the peak power for compression and ignition, as illustrated in FIG. 10, and also provide a pre-pulse and avoid the need to use one of the limited number of isotopes for the pre-pulse alone.

FIG. 14 is a table depicting various relations between driver components, energy, and other features as may occur in some embodiments. The bands of ranges in the pellet material for the different groups of isotopes may be chosen for the design purpose of driving specific features of the implosion and ignition of a fusion fuel pellet. The table illustrates the isotope features for use in HIF drivers. In some embodiments, the isotopes within each group have ranges in the materials of fusion fuel targets that are close enough to drive a number of different features of the compression and ignition devised to improve efficiency and achieve the desired output of fusion energy. These advantages are among several that are made possible in part by using beams of multiple telescoping isotopes.

Bragg Peak Generation and Operation Culmination

The microbunch duration at the pellet in FIG. 14 is based on maintaining the microbunches at 800 MHz up to and through the differential accelerator. The microbunch momentum spread for this SPRFD configuration can be 5E-4. This may also reduce the space charge force by the square of the bunch length a factor of 6.25, which minimizes or eliminates potential need for beam neutralization until the final phases of generating a driver pulse. Lower momentum spread can translate to allowing longer drift distance for a given microbunch duration at the pellet.

Handling longer microbunches by maintaining them with lower frequency RF cavities may also reduce the space charge force by approximately the square of the bunch length. Therefore, using e.g. 800 MHz compared to for example 2 GHz for microbunch maintenance may reduce the longitudinal space charge force by a factor of 6.25. Such lower space charge forces can reduce and may eliminate the potential need for beam neutralization up to the entrance of the beams into the fusion chamber, where the combination of telescoping and slicking cause the beam currents to rise rapidly and the conditions for space charge and current neutralization can be provided.

Some embodiments contemplate using specified isotopes to employ the increased energy deposition at their Bragg peaks to drive circular indentations or "waists" at specified axial stations in cylindrical pellets. As indicated in FIG. 14 and FIG. 1, these waists may sequester the relatively small masses of fusion fuel near the pellet's ends that are slated for fast ignition (in either a cylindrical or spherical configuration). In some embodiments, the waists will provide an "anvil" for the inward-moving hemispherical compression of the ends resulting from driving suitably shaped end caps. A further advantage of the waists may be to accomplish quasi-hemispherical compression of the inboard half of the fast ignition zone, which may complement the hemispherical compression of the end caps and result in quasi-spherical compression of the fuel slated for fast ignition.

The increased efficiency of fast ignition can result from igniting a fraction of the pre-compressed fuel. When fusion reactions begin in this high density (e.g., 100 g/cc) fuel, the fusion burn propagates rapidly into the rest of the high density fuel surrounding the fast ignited portion. The temperature of the burning fuel may increase rapidly by many-fold over the temperature required to ignite the burn (e.g., from about 10 keV to about 80 keV), which increases the vigor of the burn by the attendant increase of about ten-fold in the reaction rate.

By designing the implosion to leave a channel containing relatively high-density fuel at the centerline of the waists, the vigorously burning fuel in the end zones may propagate through the channel into the preponderance of the fuel in the central region. This process may result in the fusion burn propagating in the preponderance of fuel at lower density than required for fast ignition. By reducing the requirement for the energy-consuming compression of the larger portion of the fuel, this process may realize a substantial increase in the overall ratio of fusion fuel output input beam energy, e.g., lower the required beam energy for a given fusion yield. For example, while fast ignition may require fuel density like 100 g/cc to achieve with a 50 μm radius spot, the central fuel region may achieve $\rho R \sim 0.5$ g/cm$^2$ with a density of 10 g/cc and a zone heated to ignition temperature that is 0.5 mm in radius, with fusion yield of about 10 GJ from 30% burn-up of the fuel in a central region one centimeter long, and a convergence ratio of about seven for cylindrical compression from the 0.2 g/cc density of frozen DT to 10 g/cc.

FIG. 14 indicates reasonable placement of the Bragg peaks of groups and isotopes within groups. Different isotopes may be used to adjust the shown placements. The ranges may aid high energy density facilities under development to provide elevated target temperatures.

In some embodiments, microbunch stretching during the flight from the slick input to the pellet may set the maximum allowable length at the slick input to meet the requirements that the microbunch length be ≤the slug length at the pellet and that the slug duration mesh with its specified role in building the overall pulse profile. SPRFD may use larger pellets with larger fusion yields for reasons involving realism of the implosion processes and economics. Generally, long, relatively slow implosions may affect the accelerator physics favorably.

Greater energy input can imply a lower compression requirement for the bulk of the fuel, with peak fuel density like the 100 g/cc.

In some embodiments, the Bragg peak of the fastest, longest-range isotope may penetrate beyond the far end of the cylinder, but the Bragg peaks of some isotopes may be arranged to occur at two significant longitudinal positions. FIG. 14 shows isotopes selected with their relative kinetic energies set by the telescoping condition to experience their Bragg peaks at axial locations approximately the diameter of the initial fuel zone in the end regions, to facilitate quasi-spherical compression of the fuel slated for fast ignition in those end zones. The resulting increased intensity of the energy deposition may create a sphincter in the cylindrical implosion that provides a complementary backward motion for the implosion of the end caps by the shortest-range slugs. In some embodiments, the quasi-hemispherical implosion of the end caps becomes a quasi-spherical implosion of fuel in end "cells".

The convergence factor may drive the requirements for symmetry, evenness of heating, instability growth, manufacturing tolerances, etc. To attain a given density, the convergence factor may be less for spherical than cylindrical implosions. To the extent the end cells takes the shape of quasi-spheres compressed to fast ignition density, the convergence requirement may reduce from the factor for plain cylindrical toward the lesser factor of spherical, e.g. the "sausage link" of fuel between them may allow lower density.

To a degree, burn propagation into less dense fuel beyond the reduced region in a volume of lower density fuel may be similar to that aspect of the X-pellet fusion heat from the fast-ignited end cells propagating through the necked down zone being adequate to heat fuel that meets the R requirement ~1 g/cm2. In some embodiments, less energy is needed to compress the "sausage link" if lower fuel density will suffice.

Telescoping

Figure 15:
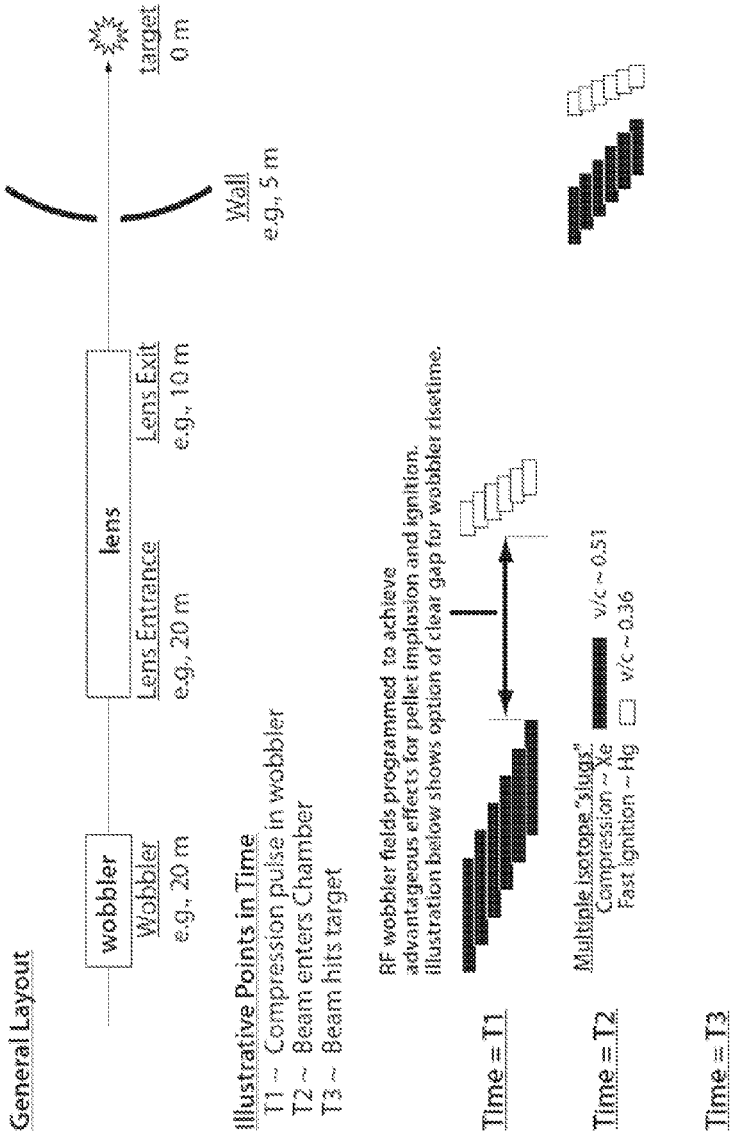
FIG. 15 depicts a plurality of microbunches prior to impact in some embodiments.

FIG. 15 depicts a plurality of microbunches prior to impact in some embodiments. Various features of this process are described in greater detail in U.S. Pub. No. 2012-0328066 "Single-pass, heavy ion fusion, systems and method for fusion power production and other applications of a large-scale neutron source", incorporated by reference herein in its entirety.

Wobblering may occur at a diversity of ion speeds. At the compression peak, beam wobble may nearly be zero, and may be zero for fast ignition on the beam's axis. Wobblering may include a conically tapered helix. The tapered helix can be made up of microbunches and may not be a continuous thread, although the microbunches can be thoroughly overlapped at the pellet. As a consequence of the helical shape the structure may be referred to as "hollow." The location of the beam centroid may be modulated by a section of RF accelerator say 50-100 m from the pellet. Wobblering may also focus the beam. The beam that is wobbled can converge similar to a cone—the essence of strong focusing is that the beams squish in one direction while expanding in the other, and the shape at the target can be circular or elliptical.

With narrow bandwidth wobbler designs, using a small number (2 or 3) wobblers in series is reasonable, to an extent. Independently phased RF wobbler cavities may be used in some embodiments and the cost to apply given RF field strengths by a multiplicity of cavities and relatively small RF sources may be offset by the economies of production methods for high quantities, such as automation.

Were a narrow bandwidth wobbler to be used, the widening of the annular thickness of beams of ions with speeds that differ appreciably from that for which the wobbler is designed may be beneficial for driving the end caps in some embodiments. For example, a wobbler's effect to spread the nominal 50 μm spot for off-speed ions may improve the heating symmetry and benefit implosion dynamics. Symmetry and smoothness of heating may be critical for achieving well-behaved hydrodynamics and good thermodynamic results. Because the end caps are ~1 cm radius, driving them with a beam concentrated to a small spot like 50 μm, i.e. a wobblered ring 50 μm in half-width, may result in a bump in pressure that would ruin the compression process. If the spot is not effectively enlarged by a wobbler in this manner, other means may be used to enlarge the beam spot as necessary.

Some embodiments reflect that symmetry and smoothness of heating is critical for achieving good hydrodynamics and good thermodynamic results. The end caps may be ~1 cm radius in some embodiments. In embodiments concentrating the beam on 50 μm, e.g. a wobblered ring 50 μm in half-width, the resulting bump in pressure may mess up the compression process.

Energy Deposition

Figure 16:
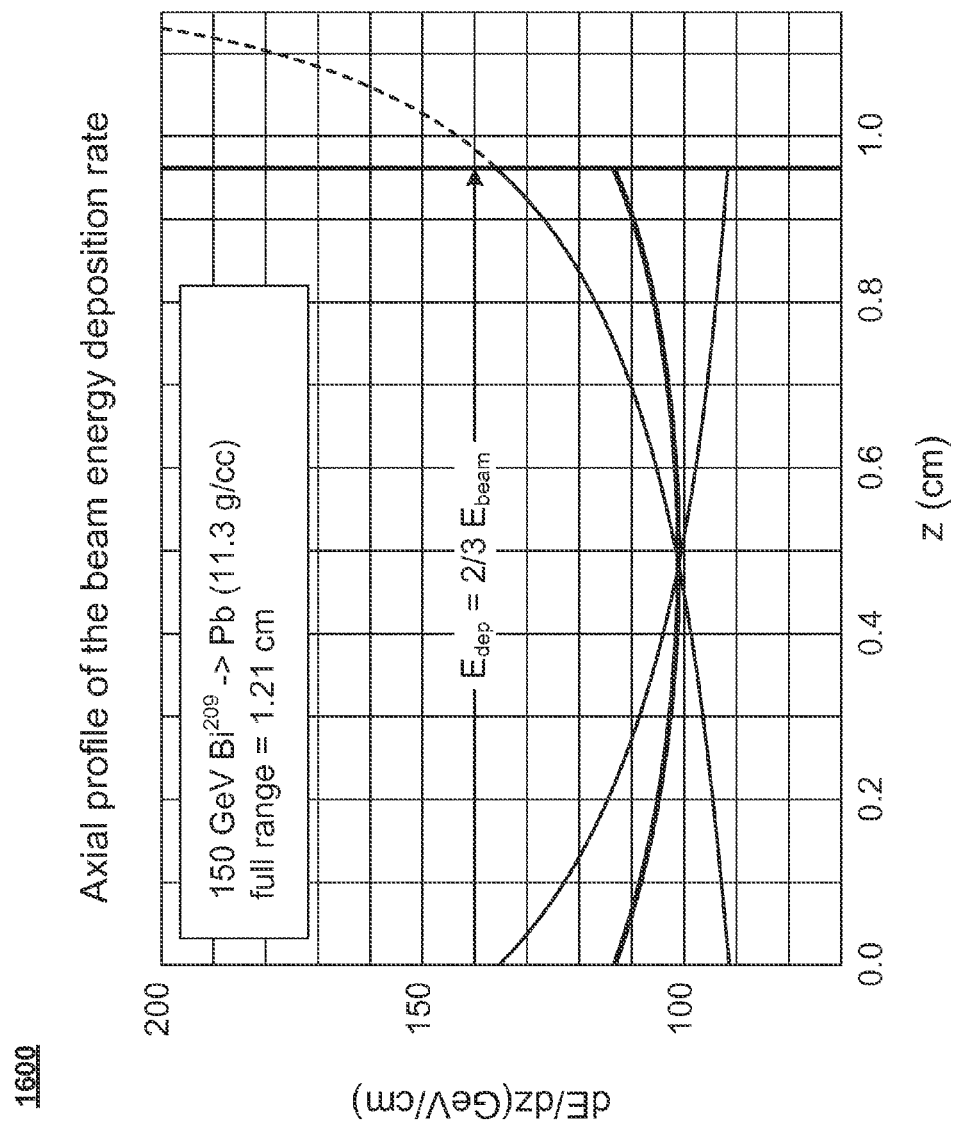
FIG. 16 is a plot of the axial profile of the beam energy deposition rate illustrating the increased energy deposition in the Bragg Peak at the end of an ion's range in the pellet material as may occur in some embodiments.

FIG. 16 is a plot of the axial profile of the beam energy deposition rate showing the substantial increase in the rate of energy deposition exhibited by heavy ions near the end of the range. The "Bragg peaks" may generally occur in the region with this higher rate of energy deposition. The resultant increased specific heating of the absorber material may be used to increase the pressure generated in the stopping material in the vicinity of the Bragg peak relative to the adjacent material. For cylindrical pellets, this higher pressure may be used to accelerate the implosion at those locations and cause a sphincter-like motion to cinch waists into the pellet.

Beam Formation

FIG. 17 depicts merging of beams in parallel linear accelerators. Some embodiments select an isotope mass which gives the energies for a set of isotopes through the telescoping condition, $\beta\gamma A^{1/4}$ constant for common magnetic rigidity (chargestate +1 for all). Some "fine tuning" of the range may be provided by practical nuclide options with different A/Z.

In some embodiments, the merge step trades an increase in transverse emittance of the 4-fold decreasing longitudinal emittance accomplished by Loop-Back Delay Lines. The transverse emittance increase may be held to a minimum by combining the beams in two steps, one using each of the transverse planes. In some embodiments, this is the only beam manipulation in the entire ignition pulse generator that intentionally increases the transverse emittance. Therefore, in some embodiments the merge defines the smallest possible transverse emittance at the target to be the emittance output from the linear accelerator times the increase of the merge.

Figure 18:
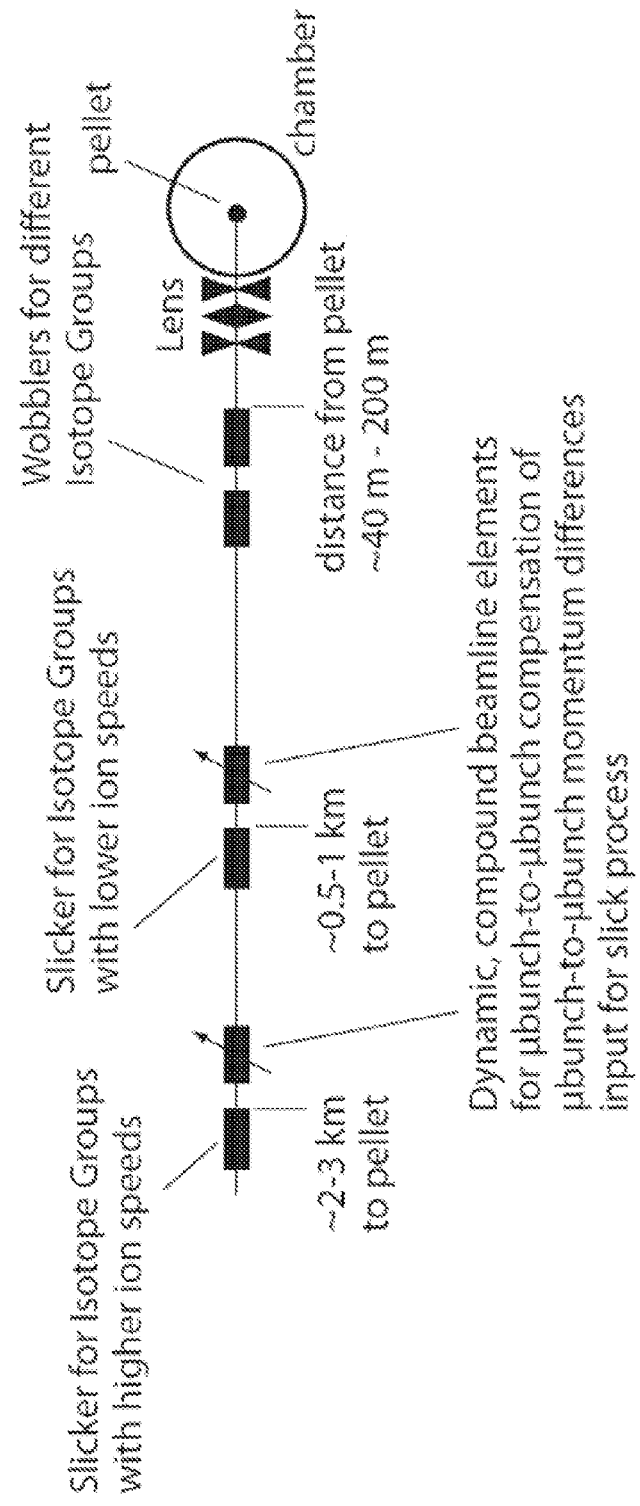
FIG. 18 illustrates the relative locations of the elements along the section of beamline that terminates at the fusion fuel pellet in some embodiments.

FIG. 18 illustrates the relative locations of the elements along the section of beamline that terminates at the fusion fuel pellet in some embodiments. The figure shows the final beam compression elements of Slick (different Slickers for two different Groups of Isotopes) and lens, and the Wobbler that creates the effect of a hollow beam at the pellet as may be used to drive cylindrical targets in some embodiments.

Dynamic Compensation for Microbunch to Microbunch Momentum Differences

Figure 19:
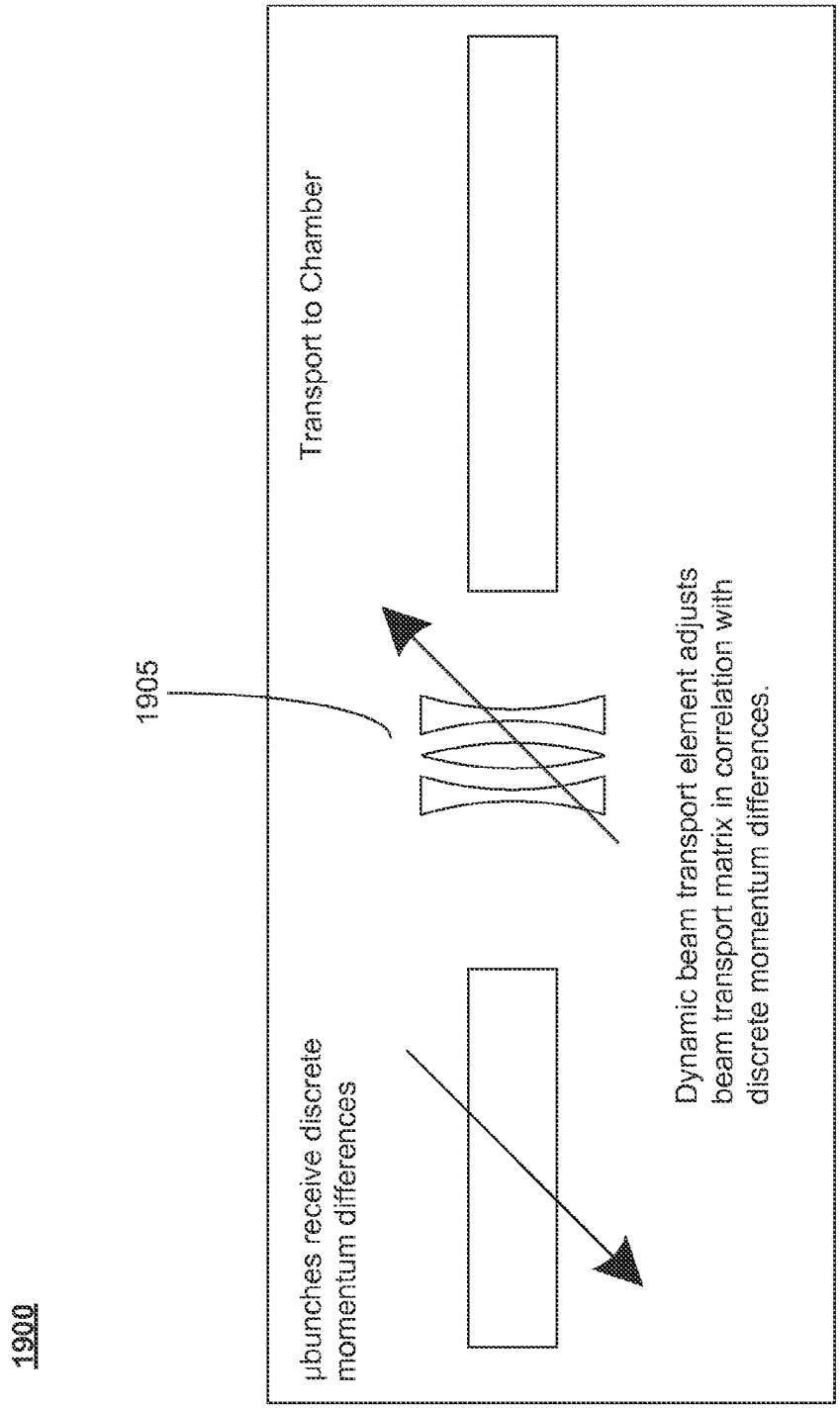
FIG. 19 depicts a dynamic, compound beamline element to adjust the overall focal length of the transport and focusing system from the Slicker to the fusion fuel pellet on a microbunch-to-microbunch basis as implemented in some embodiments.

FIG. 19 depicts a dynamic, compound beamline element to adjust the overall focal length of the transport and focusing system from the Slicker to the fusion fuel pellet on a microbunch-to-microbunch basis as implemented in some embodiments. This dynamic beamline element provides correction for the focal-plane shifts that otherwise would occur because of the differences in momentum from microbunch to microbunch that were input to cause the Slick process. Such correction can be possible because the amplitude of these discrete momentum differences are in a regular progression that can be addressed by a dynamic focusing element with correspondingly regular effects on the series of microbunches in a slug.

In some embodiments, compensation mitigates the tendency for focal points of different microbunches to shift because of the differential acceleration (which may be up to 72-3% for some isotopes). Because the differences in momentum between microbunches may be correlated and regular, time-ramped beamline transport elements 1905 immediately following the differential accelerator in some embodiments can partially correct the associated shifts of focal point (FIG. 19) after the slick that operates on a microbunch-by-microbunch basis to compensate for the normal effect of the microbunch-by-microbunch momentum differences to shift the position of the ultimate focal point.

This time varying element in the transfer matrix may be located shortly after output from the differential accelerator, were the microbunches remain axially separate. The duration of the dynamic magnetic waveform may range from r100 ns to 600 ns, for the various isotopes. The correlated amplitude change between consecutive microbunches can be 2/N of the maxima at the isotope's ends, where N is the number of microbunches in the isotope.

This process may trend the net chromatic effects at the pellet toward the lower limit of the longitudinal phase space of a single microbunch. This minimum momentum spread, scaled from HIDIF parameters, may be estimated to be about 0.04% for the 800 MHz embodiment of SPRFD, compared to 0.1% for the 2 GHz embodiment.

In some embodiments, a dynamic beam line element may be located just downstream of the differential accelerator. The beam line element may correct for the discrete axial shifts of the ultimate focal point on the pellet due to the discrete changes in the nominal moment successive microbunches. Where the microbunches remain separated axially. Chromatic and geometrical correction may be applied in some embodiments. Beam transport across the chamber, with modest vacuum r10$^j$ Torr, may favor neutralized transport, preferably with pre-ionization.

Providing electrons to make the beam neutral, e.g., as in "normal" plasma, can prevent the "space charge" of the beam from pushing it apart. This method pre-ionizes the beam channels so that the mobile electrons move so as to neutralize the space charge.

In some embodiments, the slow 1 pp of FPC's chambers eliminates electromagnetic disturbances from previous pulses. In some embodiments, the environment may be damped out on a 10 ms time scale as a result of the thorough disruption and recovery of patterns of stream jets, sheets, droplet sprays, tangential flows along the chamber walls, and regulated fountains from below the fusion reaction zone. In some embodiments, a final 30 cm cone hollowed in the room-temperature lithium sabot may have internal target reticle-films, and also may have a captured atmosphere with a specific gas and optimal density, if helpful to focusing. All these features may derive from slow pulsing fusion yields (e.g., 10 GWth per chamber), achieved by an accordingly large driver. The lens bore volumes may likewise benefit from slow pulsing. In some embodiments, lithium's adsorption pump benefit is naturally adapted to maintaining quite low neutral density in the bore tubes.

Finally, whereas all other chambers may inject lithium at temperatures not far below the desired working fluid hotside temperature, present embodiments contemplate that a chamber injects lithium at temperatures in the vicinity of its melting point, where the lithium vapor pressure is even lower than in other designs, providing even higher pumping speed and recovery of desirable chamber conditions.

General Benefits of Certain Embodiments

The discussed approach in some embodiments has several benefits, including e.g. 1) reduce the convergence factor where the highest compression is needed by approaching spherical compression geometry, and (2) relieve compression requirements on the bulk of the fuel by propagating the burn that was fast ignited through the neck and into fuel at lower density.

Remarks

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers, computer systems, control circuits for RF cavities, etc., those skilled in the art will appreciate that the various embodiments are capable of being distributed as a program product in a variety of forms, and that the disclosure applies equally regardless of the particular type of machine or computer-readable media used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A system for compressing a fuel source, the system comprising:
 a first component configured to segregate a first plurality of ions based upon their corresponding isotopes into a first plurality of microbunches, each microbunch comprising a grouping of said ions, each group associated with a same species;
 a second component configured to:
  separate the first plurality of microbunches in space by applying a first electromagnetic wave in a resonant radiofrequency (RF) structure at a first RF frequency; and
  adjust the first electromagnetic wave to reduce the distance between the microbunches of the first plurality of microbunches;
 a third component configured to reduce the distance between a center of mass of the first plurality of ions and a center of mass of a second plurality of ions; and
 a fuel chamber comprising at least one layer surrounding at least a portion of a fuel source, the at least one layer configured to receive the first plurality of ions and the second plurality of ions such that compression of the one or more layers is maximized relative to one or more Bragg peaks associated with the first plurality of ions and the second plurality of ions.

2. The system of claim 1, wherein the second plurality of ions are more widely dispersed than the first plurality of ions and wherein the system is configured to provide the second plurality of ions to a fourth component before the first plurality of ions are delivered to the second component, wherein the fourth component is configured to:
 separate the second plurality of microbunches in space by applying a second electromagnetic wave; and
 increase the frequency of the second electromagnetic wave to reduce the distance between the microbunches of the second plurality of microbunches.

3. The system of claim 1, wherein the third component is a telescope configured to merge a plurality of ion beams.

4. The system of claim 1, wherein the first component comprises a species alignment device.

5. The system of claim 1, wherein the first, second, and third components comprise RF cavities.

6. The system of claim 1, wherein first plurality of ions is configured to drive the waists of the fuel source.

7. The system of claim 1, wherein second plurality of ions is configured to compress end caps located in the fuel chamber.

8. A system for preparing an ion composition, the system comprising:
 a first component configured to segregate a first plurality of ions based upon their corresponding isotopes into a first plurality of microbunches, each microbunch comprising a grouping of said ions, each group associated with a same species;
 a second component configured to:
  separate the first plurality of microbunches in space by applying a first electromagnetic wave in a resonant radiofrequency (RF) structure at a first RF frequency; and
  adjust the first electromagnetic wave to reduce the distance between the microbunches of the first plurality of microbunches; and
 a third component configured to reduce the distance between a center of mass of the first plurality of ions and a center of mass of a second plurality of ions.

9. The system of claim 8, wherein the third component is a telescope configured to merge a plurality of ion beams.

10. The system of claim 8, wherein the first component comprises a species alignment device.

11. The system of claim 8, wherein the first, second, and third components comprise RF cavities.

12. The system of claim 8, wherein first plurality of ions is configured to drive the waists of the fuel source.

13. A system for compressing and igniting fuel in a fuel capsule, the system comprising:
 a first component configured to produce a timed sequence of continuous blocks of ions in a plurality of parallel streams in independent channels, each of said blocks based upon a different one of a set of isotopes, said plurality of parallel channels being replicated in a plurality of parallel units of said first component, each parallel unit comprising an array of a plurality of originating ion sources, each one of the said plurality of originating ion sources in each of the said arrays being based upon a different one of the respective isotopes;
 a second component configured to subdivide each one of the sequences of continuous blocks of the pluralities of parallel streams of the first pluralities of ions based upon their respective isotopes in the first pluralities of parallel channels and transform the continuous blocks into regular time-sequences of first blocks of pluralities of microbunches, each of said blocks of microbunches comprising ions of only one of the respective isotopes, by applying a first electromagnetic wave in a resonant radiofrequency (RF) structure at a first RF frequency;

a third component comprising a system of magnets, one or more of of which comprise pulsed magnetic fields and one or more of which comprise continuous magnetic fields, configured to route in individual channels, each one of the pluralities of parallel beams of the sequences of blocks of microbunches comprising ions of the respective isotopes originated in the ion sources of the first component, in each of the plurality of parallel units of the first component, said routing culminating in directing all of the parallel beams of each one of the plurality of parallel units, in the unchanged time-sequence of blocks of microbunches of the respective isotopes, into a single beamline, the number of said beamlines having a same plurality as that of the plurality of parallel units of the first component;

a fourth component configured to step-wise compact in space and time, pairs of the beams, reducing the number of parallel beamlines from the plurality of parallel units of the first component by a defined factor, said factor being a defined power of two, by interlacing the microbunches within the pluralities of blocks of microbunches of the respective isotopes as created at a first RF frequency in the second component, into a next plurality of beams comprising the unchanged sequence of blocks of mirobunches of the respective isotopes, with each of the regularly time-spaced microbunches appropriately positioned on RF waves of a second RF accelerator structure, said second RF accelerator structure at a RF frequency that is twice that of the first RF frequency, said interlacing halving a distance between a center of mass of successive microbunches, resulting in the blocks of the second plurality of beams comprising the unchanged sequence of blocks of microbunches of the respective isotopes having twice the number of microbunches of their respective isotopes as compared to the number of microbunches comprising the blocks of the same isotopes in each of the first plurality of beamlines in the first RF accelerator structure;

said fourth component comprising multiple steps of doubling a beam current by said interlacing of the microbunches of pairs of beams from an upstream accelerator structure at one RF frequency into a second, downstream RF accelerator structure operating at twice the RF frequency of the upstream RF accelerator structure, said multiple steps of interlacing microbunches at doublings of the RF frequency of the RF accelerator structures increasing the number of microbunches in the blocks of respective isotopes by a factor that is a power of two, wherein said power of two comprises a multiplicity of interleaving steps, said increase in number of microbunches per block increasing the beam currents by a same factor.

* * * * *